(12) United States Patent
Chatterjee et al.

(10) Patent No.: US 12,587,247 B2
(45) Date of Patent: Mar. 24, 2026

(54) SUBBAND REPORTING FOR FULL DUPLEX OPERATION

(71) Applicant: Intel Corporation, Santa Clara, CA (US)

(72) Inventors: Debdeep Chatterjee, San Jose, CA (US); Gang Xiong, Beaverton, OR (US); Yingyang Li, Beijing (CN); Sergey Panteleev, Maynooth (IE); Victor Sergeev, Nizhny Novgorod (RU); Salvatore Talarico, Los Gatos, CA (US); Yi Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 18/243,216

(22) Filed: Sep. 7, 2023

(65) Prior Publication Data

US 2023/0421222 A1     Dec. 28, 2023

Related U.S. Application Data

(60) Provisional application No. 63/494,149, filed on Apr. 4, 2023, provisional application No. 63/410,982, filed on Sep. 28, 2022.

(51) Int. Cl.
| | |
|---|---|
| *H04W 76/20* | (2018.01) |
| *H04B 7/06* | (2006.01) |
| *H04L 5/14* | (2006.01) |

(52) U.S. Cl.
CPC ............. *H04B 7/0626* (2013.01); *H04L 5/14* (2013.01); *H04W 76/20* (2018.02)

(58) Field of Classification Search
CPC ......... H04L 5/14; H04L 5/001; H04L 5/0048; H04W 72/0453; H04W 72/0446; H04W 72/0457; H04W 72/231; H04W 76/20
See application file for complete search history.

(56) References Cited

U.S. PATENT DOCUMENTS

| | | | |
|---|---|---|---|
| 2024/0015546 A1* | 1/2024 | Awadin | H04W 24/10 |
| 2024/0113846 A1* | 4/2024 | Abdelghaffar | H04L 5/14 |

* cited by examiner

*Primary Examiner* — Jamal Javaid
(74) *Attorney, Agent, or Firm* — Schwegman Lundberg & Woessner, P.A.

(57) ABSTRACT

A computer-readable storage medium stores instructions for execution by one or more processors of a UE to configure the UE for SBFD operation in a 5G NR network, and to cause the UE to decode RRC signaling received from a base station and including at least one CSI-RS resource set with time-frequency resource allocation associated with a CSI-RS transmission. A CSI reporting band is determined with a plurality of PRBs based on the RRC signaling. The CSI reporting band including a subset of the plurality of PRBs associated with one or more DL subband(s) in symbols or slots identified via higher layer signaling or a combination of higher layer and Layer 1 signaling for SBFD operation. Channel measurements are performed based on CSI-RSs transmitted during the CSI-RS transmission. The measurements are associated with the subset of the plurality of PRBs in the CSI reporting band.

16 Claims, 17 Drawing Sheets

140C

NSSF 142

Nnssf 158A

NEF 154

Nnef 158B

NRF 156

Nnrf 158C

PCF 148

Npcf 158D

UDM

Nudm 158E

AF 150

Naf 158F

AUSF 144

Nausf 158G

AMF 132

Namf 158H

SMF 136

Nsmf 158I

UPF 134

DN 152

N6

N9

N4

N3

N2

N1

UU (R)AN 110

UE 101

700

SB5   SB4   SB3   SB2   SB1

BWP

SB bitmap: 1 1 0 1 1

1100

SB4

SB3

SB2

SB1

DL UL DL

SB bitmap: 1 1 1 1

SUBBAND REPORTING FOR FULL DUPLEX OPERATION

PRIORITY CLAIM

This application claims the benefit of priority to the following patent applications:

U.S. Provisional Patent Application No. 63/410,982, filed Sep. 28, 2022, and entitled "SUBBAND REPORTING FOR FULL DUPLEX OPERATION;" and U.S. Provisional Patent Application No. 63/494,149, filed Apr. 4, 2023, and entitled "SUBBAND REPORTING FOR FULL DUPLEX OPERATION."

Each of the above-listed applications is incorporated herein by reference in its entirety.

BACKGROUND

Mobile communications have evolved significantly from early voice systems to today's highly sophisticated integrated communication platform. With the increase in diverse types of devices communicating with various network devices, the usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next-generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As the current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G (and beyond) systems. Such enhanced operations can include techniques for subband reporting for full duplex operation.

BRIEF DESCRIPTION OF THE FIGURES

In the figures, which are not necessarily drawn to scale, like numerals may describe similar components in different views. Like numerals having different letter suffixes may represent different instances of similar components. The figures illustrate, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
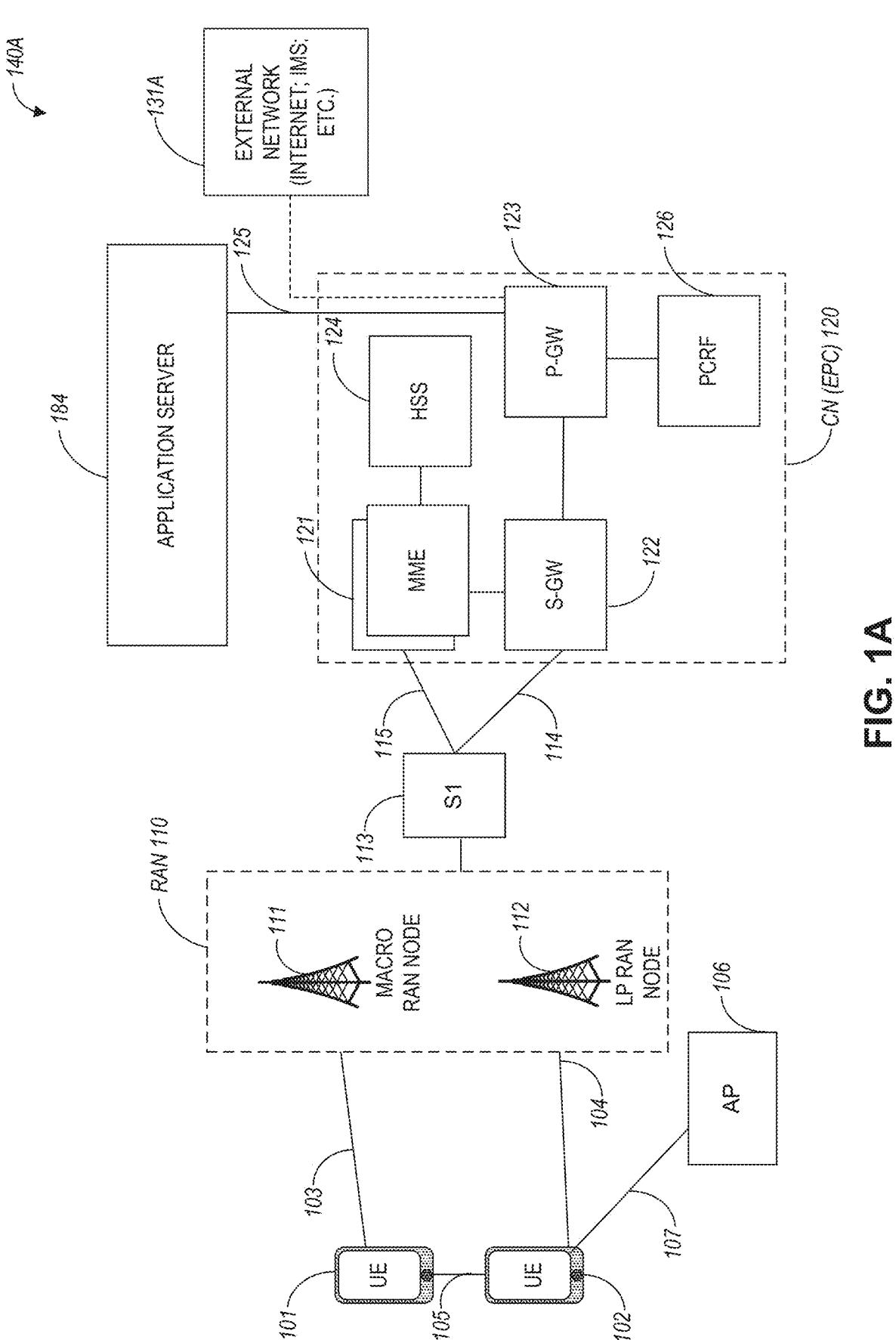
FIG. 1A illustrates the architecture of a network, in accordance with some aspects.

FIG. 1A illustrates the architecture of a network in accordance with some aspects. The communication network 140A is shown to include user equipment (UE) 101 and UE 102. The UE 101 and UE 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. UE 101 and UE 102 can be collectively referred to herein as UE 101, and UE 101 can be used to perform one or more of the techniques disclosed herein.

Any of the radio links described herein (e.g., as used in the communication network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UE 101 and UE 102 can comprise an Internet-of-Things (IoT) UE or a Cellular IoT (CIoT) UE, which can comprise a network access layer designed for low-power IoT applications utilizing short-lived UE connections. In some aspects, any of the UE 101 and UE 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UE 101 and UE 102 can include enhanced MTC (eMTC) UEs or further enhanced MTC (FeMTC) UEs.

The UE 101 and UE 102 may be configured to connect, e.g., communicatively coupled, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UE 101 and UE 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UE 101 and UE 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN nodes, and one or more RAN nodes for providing femtocells or picocells (e.g., cells having smaller coverage areas, smaller user capacity, or higher bandwidth compared to macrocells), e.g., low power (LP) RAN node or an unlicensed spectrum based secondary RAN node.

Any of the communication nodes 111 and 112 can terminate the air interface protocol and can be the first point of contact for UE 101 and UE 102. In some aspects, any of the communication nodes 111 and 112 can fulfill various logical functions for the RAN 110 including, but not limited to, the radio network controller (RNC) functions such as radio bearer management, uplink and downlink dynamic radio resource management, and data packet scheduling, and mobility management. In an example, any of the communication nodes 111 and/or 112 can be a new generation Node-B (gNB), an evolved node-B (eNB), or another type of RAN node.

Figure 1B:
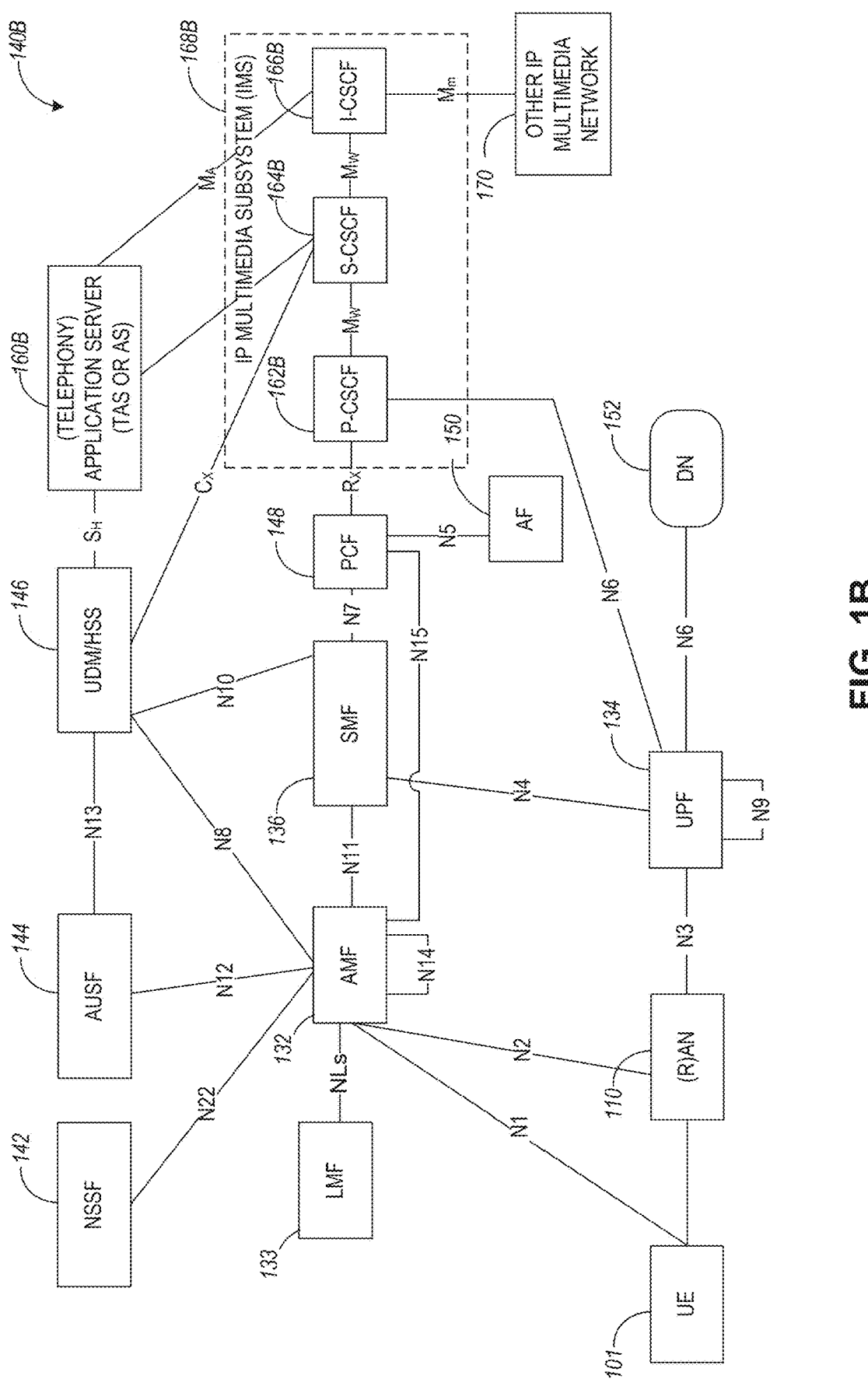
FIG. 1B and FIG. 1C illustrate a non-roaming 5G system architecture in accordance with some aspects.
Figure 1C:

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in FIGS. 1B-1C). In this aspect, the S1 interface 113 is split into two parts: the S1-U interface 114, which carries user traffic data between the communication nodes 111 and 112 and the serving gateway (S-GW) 122, and the S1-mobility management entity (MME) interface 115, which is a signaling interface between the communication nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network (e.g., CN 120) and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. The application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UE 101 and UE 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband IoT (NB-IoT).

An NG system architecture can include the RAN 110 and a 5G core network (e.g., CN 120). RAN 110 in an NG system can be referred to as NG-RAN. The RAN 110 can include a plurality of nodes, such as gNBs and NG-eNBs. The CN 120 (also referred to as a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the RAN 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next-generation control plane interface (NG-C). In some aspects, LMF 133 configures the UE using the LTE positioning protocol (LPP) via AMF 132. The RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can function as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IMS 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network opera-tor, or a roaming subscriber currently located within that network operator's service area. In some aspects, the I-CSCF 166B can be connected to another IP multimedia network 170, e.g., an IMS operated by a different network operator.

In some aspects, the UDM/HSS 146 can be coupled to an application server (AS) 160B, which can include a tele-phony application server (TAS) or another AS. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (be-tween the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM/HSS 146 and the AMF 132, not shown), N9 (between two UPFs, not shown), N10 (between the UDM/HSS 146 and the SMF 136, not shown), N11 (between the AMF 132 and the SMF 136, not shown), N12 (between the AUSF 144 and the AMF 132, not shown), N13 (between the AUSF 144 and the UDM/HSS 146, not shown), N14 (between two AMFs, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

FIG. 1C illustrates a 5G system architecture 140C and a service-based representation. In addition to the network entities illustrated in FIG. 1B, the 5G system architecture 140C can also include a network exposure function (NEF) 154 and a network repository function (NRF) 156. In some aspects, 5G system architectures can be service-based and interaction between network functions can be represented by corresponding point-to-point reference points Ni or as ser-vice-based interfaces.

In some aspects, as illustrated in FIG. 1C, service-based representations can be used to represent network functions within the control plane that enable other authorized net-work functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM/HSS 146), Naf 158F (a service-based interface exhibited by the AF 150), Nnrf 158C (a service-based interface exhibited by the NRF 156), Nnssf 158A (a service-based interface exhib-ited by the NSSF 142), Nausf 158G (a service-based inter-face exhibited by the AUSF 144). Other service-based interfaces (e.g., Nudr, N5g-eir, and Nudsf) not shown in FIG. 1C can also be used.

FIGS. 2-15 illustrate various systems, devices, and com-ponents that may implement aspects of disclosed embodi-ments in different communication systems, such as 5G-NR networks including 5G non-terrestrial networks (NTNs). UEs, base stations (such as gNBs), and/or other nodes (e.g., satellites or other NTN nodes) discussed herein can be configured to perform the disclosed techniques.

Figure 2:
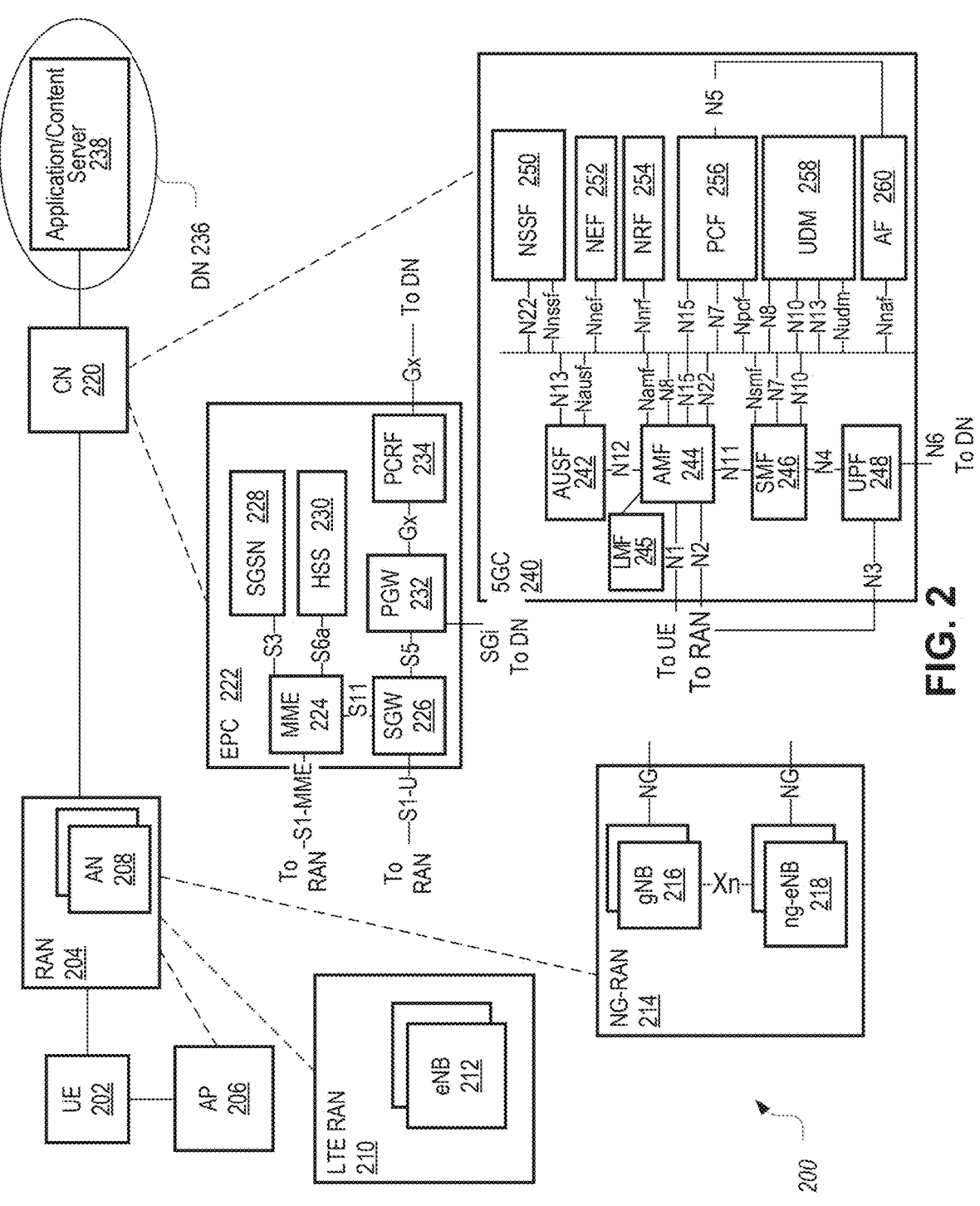
FIG. 2, FIG. 3, and FIG. 4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodi-ments are not limited in this regard and the described embodiments may apply to other networks that benefit from the principles described herein, such as future 3GPP sys-tems, or the like.

The network 200 may include a UE 202, which may include any mobile or non-mobile computing device designed to communicate with a RAN 204 via an over-the-air connection. The UE 202 may be but is not limited to, a smartphone, tablet computer, wearable computing device, desktop computer, laptop computer, in-vehicle infotainment, in-car entertainment device, instrument cluster, a head-up display device, onboard diagnostic device, dashtop mobile equipment, mobile data terminal, electronic engine manage-ment system, electronic/engine control unit, electronic/en-gine control module, embedded system, sensor, microcon-troller, control module, engine management system, networked appliance, machine-type communication device, M2M or D2D device, IoT device, etc.

In some embodiments, network 200 may include a plu-rality of UEs coupled directly with one another via a sidelink interface. The UEs may be M2M/D2D devices that com-municate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/ LWIP). Cellular-WLAN aggregation may involve the UE 202 configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be imple-mented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plu-rality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordi-nation, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG, and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/SCells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or stationary) UE. An RSU implemented in or by a UE may be referred to as a "UE-type RSU;" an eNB may be referred to as an "eNB-type RSU;" a gNB may be referred to as a "gNB-type RSU;" and the like. In one example, an RSU is a computing device coupled with radio frequency circuitry located on a roadside that provides connectivity support to passing vehicle UEs. The RSU may also include internal data storage circuitry to store intersection map geometry, traffic statistics, and media, as well as applications/software to sense and control ongoing vehicular and pedestrian traffic. The RSU may provide extremely low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) which is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN (e.g., CN 220).

The PGW 232 may terminate an SGi interface toward a data network (DN) 236 that may include an application/content server 238. The PGW 232 may route data packets between the LTE CN and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for the provision of IMS services. The PGW 232 may be coupled with a PCRF 234 via a Gx reference point.

The PCRF 234 is the policy and charging control element of the CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for the authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NS-SAIs if needed. The NSSF 250 may also determine the AMF set to be used to serve the UE 202, or a list of candidate AMFs based on a suitable configuration and by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide information on the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant to policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, and application request information for multiple UE) for the NEF 252. The Nudr service-based interface may be exhibited by the UDR to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

In some aspects, network 200 is configured for NR positioning using the location management function (LMF) 245, which can be configured as an LMF node or as functionality in a different type of node. In some embodiments, LMF 245 is configured to receive measurements and assistance information from NG-RAN 214 and UE 202 via the AMF 244 (e.g., using an NLs interface) to compute the position of the UE. In some embodiments, the NR positioning protocol A (NRPPa) protocol can be used for carrying the positioning information between NG-RAN 214 and LMF 245 over a next-generation control plane interface (NG-C). In some embodiments, LMF 245 configures the UE 202 using LTE positioning protocol (LPP) (e.g., LPP-based communication link) via the AMF 244. In some aspects, NG-RAN 214 configures the UE 202 using, e.g., radio resource control (RRC) protocol signaling over, e.g., LTE-Uu and NR-Uu interfaces. In some aspects, UE 202 uses the LTE-Uu interface to communicate with the ng-eNB 218 and the NR-Uu interface to communicate with the gNB 216. In some aspects, ng-eNB 216 and gNB 216 use NG-C interfaces to communicate with the AMF 244.

In some embodiments, the following reference signals can be used to achieve positioning measurements in NR communication networks: NR positioning reference signal (NR PRS) in the downlink and sounding reference signal (SRS) for positioning in the uplink. The downlink positioning reference signal (PRS) can be used as a reference signal supporting downlink-based positioning techniques. In some aspects, the entire NR bandwidth can be covered by transmitting PRS over multiple symbols that can be aggregated to accumulate power.

Figure 3:
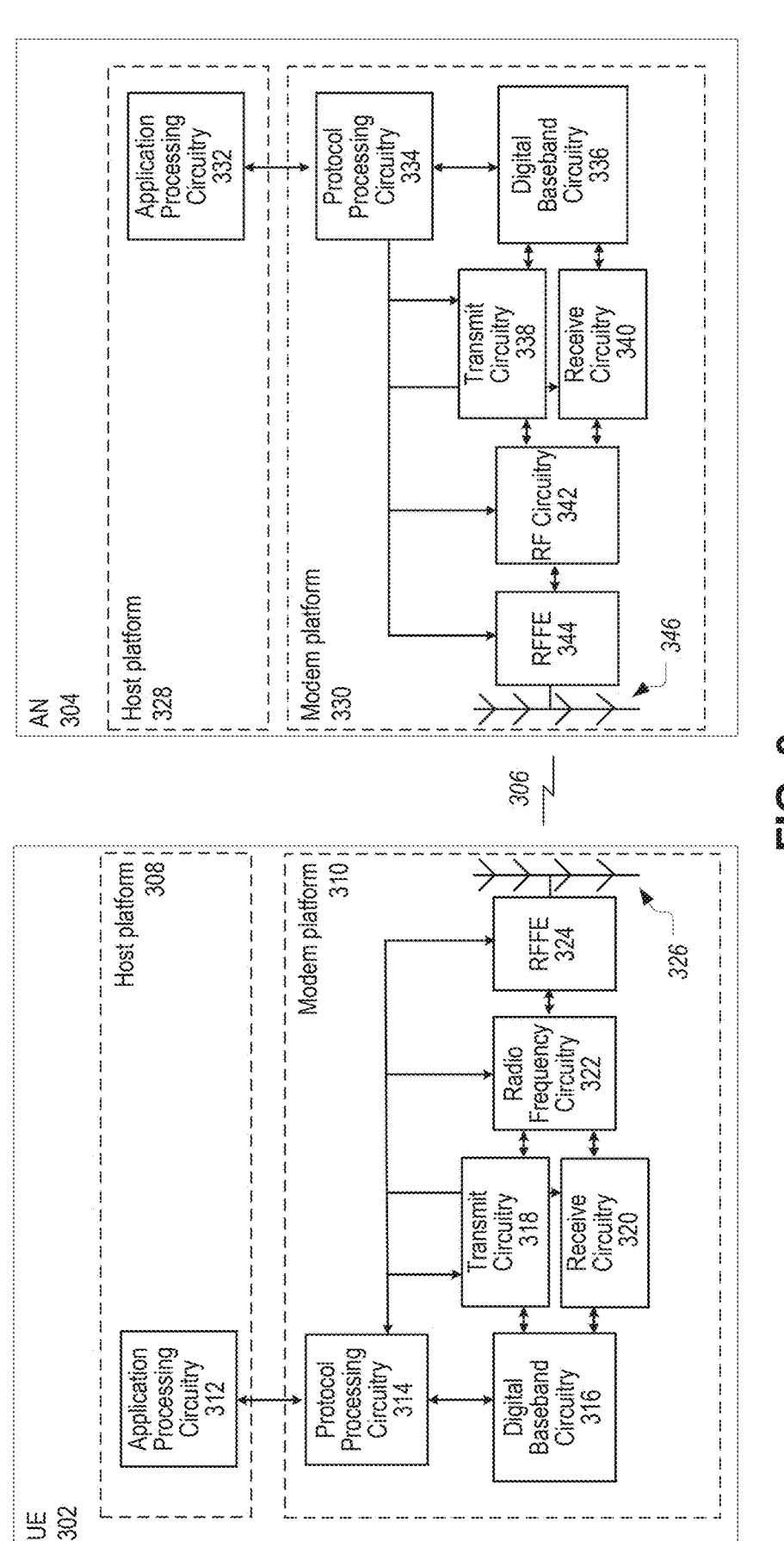

FIG. 3 schematically illustrates a wireless network 300 in accordance with various embodiments. The wireless network 300 may include a UE 302 in wireless communication with AN 304. The UE 302 and AN 304 may be similar to, and interchangeable with, like-named components described elsewhere herein.

The UE 302 may be communicatively coupled with the AN 304 via connection 306. Connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example IP) operations.

The protocol processing circuitry 314 may implement one or more layer operations to facilitate the transmission or reception of data over connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318 receive circuitry 320, RF circuitry 322, RFFE 324, and one or more antenna panels 326 (referred to generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the one or more antenna panels 326, RFFE 324, RF circuitry 322, receive circuitry 320, digital baseband circuitry 316, and protocol processing circuitry 314. In some embodiments, the one or more antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and one or more antenna panels 326. In some embodiments, transmit components of the UE 302 may apply a spatial filter to the data to be transmitted to form a transmit beam emitted by the antenna elements of the one or more antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and interchangeable with the like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

Figure 4:
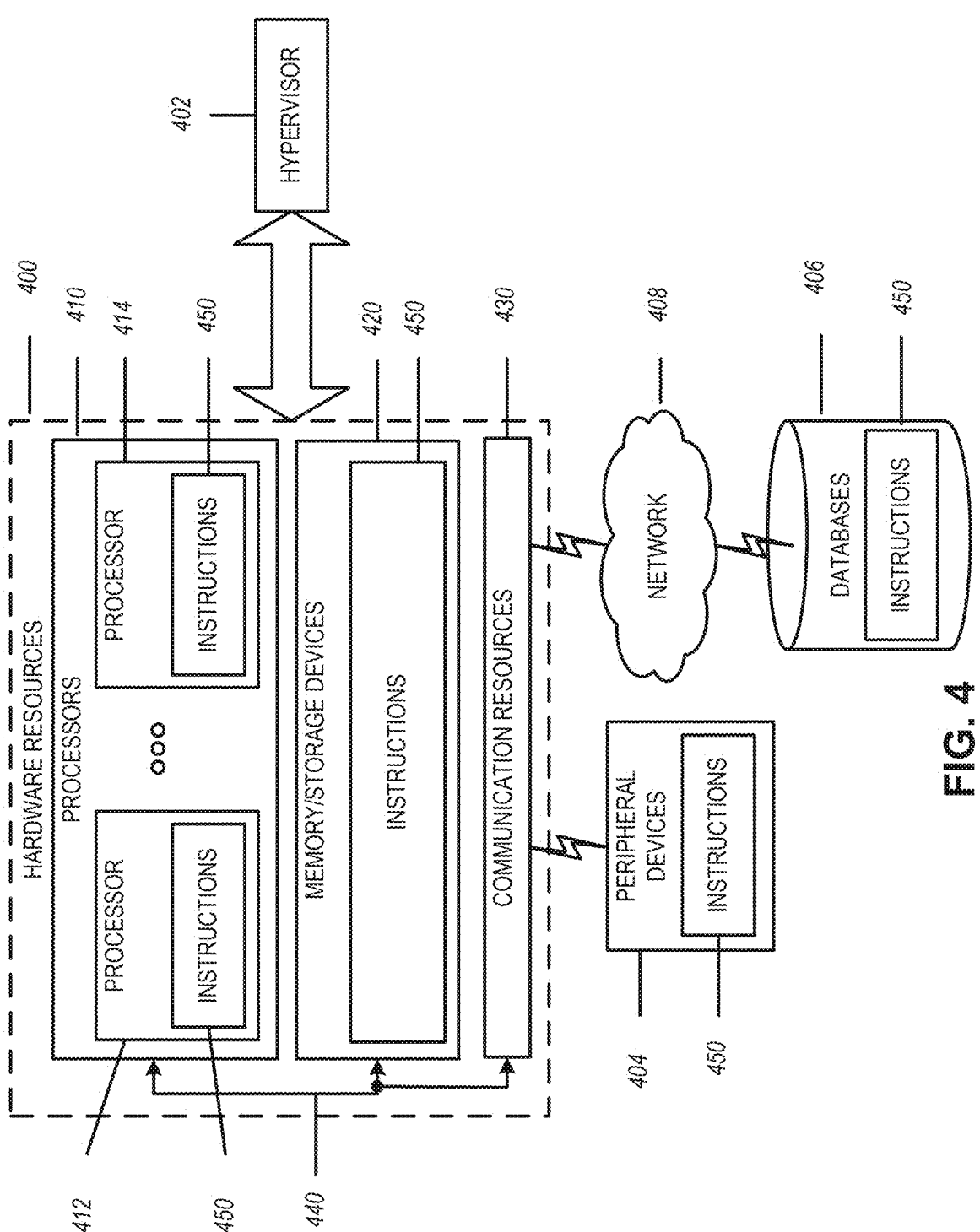

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or another interface circuitry. For embodiments where node virtualization (e.g., NFV) is utilized, a hypervisor 402 may be executed to provide an execution environment for one or more network slices/subslices to utilize the hardware resources 400.

The one or more processors 410 may include, for example, a processor 412 and a processor 414. The one or more processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The one or more communication resources 430 may include interconnection or network interface controllers, components, or other suitable devices to communicate with one or more peripheral devices 404 or one or more databases 406 or other network elements via a network 408. For example, the one or more communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the one or more processors 410 to perform any one or more of the methodologies discussed herein. The instructions 450 may reside, completely or partially, within at least one of the one or more processors 410 (e.g., within the processor's cache memory), the memory/storage devices 420, or any suitable combination thereof. Furthermore, any portion of the instructions 450 may be transferred to the hardware resources 400 from any combination of the one or more peripheral devices 404 or the one or more databases 406. Accordingly, the memory of the one or more processors 410, the memory/storage devices 420, the one or more peripheral devices 404, and the one or more databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, or environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. An ML algorithm is a computer program that learns from experience concerning some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific to an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, which hosts the training of the model. The term "ML inference host" refers to an entity, such as a network function, which hosts the model during inference mode (which includes both the model execution as well as any online learning if applicable). The ML host informs the actor about the output of the ML algorithm, and the actor decides on an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Time Division Duplex (TDD) is now widely used in commercial NR deployments. The time domain resource is split between downlink and uplink symbols. Allocation of a limited time duration for the uplink in TDD can result in reduced coverage and increased latency for a given target data rate. To improve the performance of uplink (UL) communications in TDD, simultaneous transmission/reception of downlink and uplink respectively, also referred to as "full duplex communication" can be considered. In this regard, the disclosed techniques can include a non-overlapping Sub-Band Full Duplex (SBFD) at the gNB.

For SBFD, within a carrier bandwidth, some bandwidth can be allocated as UL, while some bandwidth can be allocated as downlink (DL) within the same symbol, however, the UL and DL resources are non-overlapping in the frequency domain. Under this operational mode, at a given symbol a gNB can simultaneously transmit DL signals and receive UL signals, while a UE may only transmit or receive at a time.

For a UE that may be provided with the information on SBFD operations at the gNB, the UE may identify SBFD symbols and non-SBFD symbols. The UE may behave differently for SBFD symbols and non-SBFD symbols. The disclosed techniques include CSI reporting by a UE under a gNB with an SBFD operation, such as the subband reporting by a UE under a gNB with an SBFD operation, and CSI reference resource determination.

Figure 5:
FIG. 5 illustrates unidirectional downlink/uplink (DL/UL) resource allocation in a serving cell, in accordance with some aspects.
Figure 5:
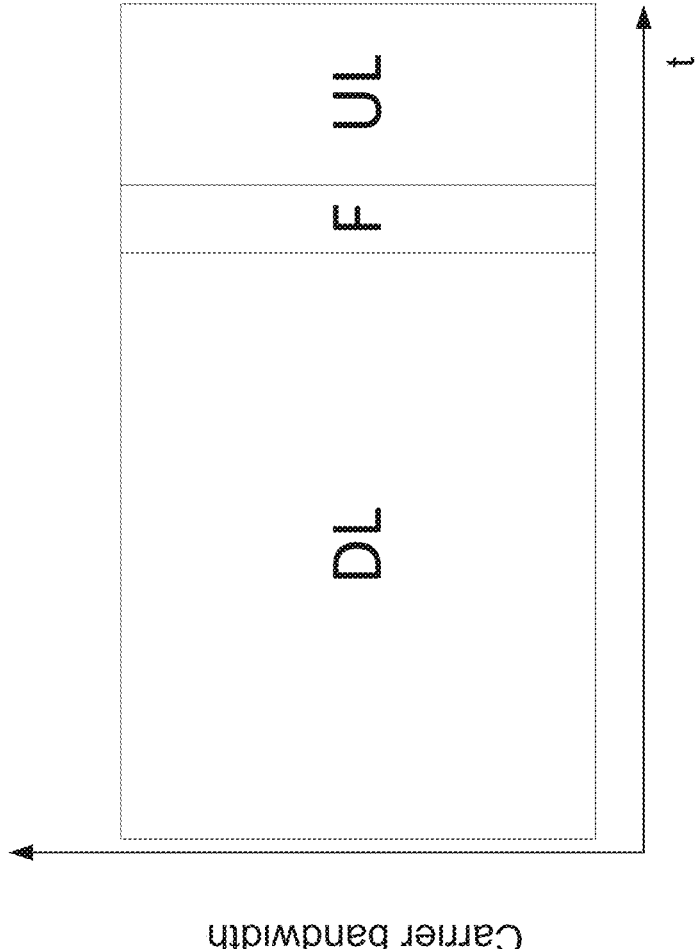

FIG. 5 includes diagram 500 of unidirectional downlink/uplink (DL/UL) resource allocation in a serving cell, in accordance with some aspects. For a serving cell with legacy TDD operation, DL/UL resources can be configured unidirectionally in the time domain. The time domain granularity can be an OFDM symbol. In NR Rel-15/16/17, a symbol can be a DL symbol, an UL symbol, or a flexible symbol as shown in FIG. 5. Further, such attribution between DL/UL/Flexible can be indicated to a UE via semi-static or dynamic signaling with some differences in UE behavior for handling of flexible symbols depending on the whether the indication is based on semi-static configuration or dynamic signaling (e.g., using DCI format 2_0).

Figure 6:
FIG. 6 illustrates subband full duplex (SBFD)-based DL/UL resource allocation in a serving cell, in accordance with some aspects.
Figure 6:
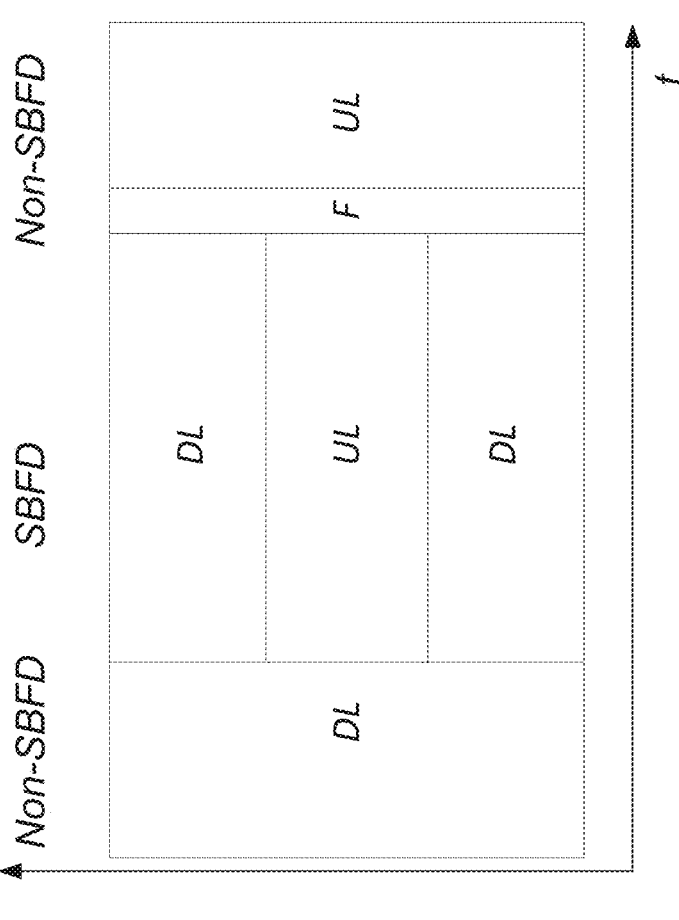

FIG. 6 illustrates diagram 600 of subband full duplex (SBFD)-based DL/UL resource allocation in a serving cell, in accordance with some aspects. For a serving cell with SBFD operation, a symbol can be used to map both DL and UL physical channels or signals. Thus, for a given PRB in a symbol, the resources may be identified as DL, UL, or flexible resources as illustrated in FIG. 6.

As shown in FIG. 6, in a symbol, frequency resources may be divided into DL/UL/Flexible resources in different non-overlapped sub-bands. Here and in the rest of the disclosure, a "sub-band" corresponds to a set of physical resources within a carrier that are contiguous in frequency, e.g., a number of consecutive Physical Resource Blocks (PRBs) on the Common Resource Block (CRB) grid.

As used herein, a "non-SBFD symbol" implies a symbol in which the gNB only transmits or only receives (non-SBFD operation), e.g., legacy full DL/UL/Flexible symbol. A "SBFD symbol" (may also be referred to as "Full Duplex (FD) symbol" for brevity) implies a symbol in which the gNB may transmit in the DL and receive in the UL simultaneously (SBFD operation). Such a symbol may be identified by a UE based on the configuration of SBFD operation (e.g., when configured with at least one DL and at least one UL sub-band in the symbol), or based on one or more of the following: TDD configuration, dynamic slot formats (via DCI format 2_0), higher layer configuration, or dynamic L1 signaling of transmission or reception occasions. For example, for a semi-statically configured SBFD symbol, if gNB schedules DL overlapping with the UL subband in the SBFD symbol, the symbol can be assumed to switch to the legacy DL symbol. UL subband in the symbol is not considered as UL subband in this case.

CSI Resource for SBFD and Non-SBFD

One CSI resource setting, e.g., a CSI-ResourceConfig, can consist of one or multiple CSI-RS resource sets. One CSI-RS resource set can consist of one or multiple CSI-RS resources. One CSI-RS resource consists of one or multiple CSI-RS resource occasions. For example, for an aperiodic CSI-RS resource, the CSI-RS resource may consist of one occasion, which is determined by the slot of CSI request reception and a triggering offset. For a periodic or semi-persistent CSI-RS resource, the CSI-RS resource consists of multiple occasions in a different period.

In some aspects, in the configuration of a CSI resource setting, the associated SBFD operation type may be configured, i.e., a CSI resource setting is associated with measurements for SBFD operation or for non-SBFD operation.

In one option, for a CSI resource setting for SBFD operation, a UE may expect that all occasions of all CSI-RS resources in the CSI resource setting are within SBFD symbols. For a CSI resource setting for non-SBFD operation, a UE may expect that all occasions of all CSI-RS resources in the CSI resource setting are within non-SBFD symbols.

In another option, for a CSI resource setting for SBFD operation, some of the occasions of a CSI-RS resource in the resource setting can be within SBFD symbols and some of the occasions of the CSI-RS resource can be overlapped with non-SBFD symbols. In this case, only the occasions within SBFD symbols may be considered valid occasions by a UE for the CSI-RS resource, i.e., the UE derives CSI only for valid occasions of the CSI-RS resource. For a CSI resource setting for non-SBFD operation, some occasions of a CSI-RS resource can be within non-SBFD symbols and some occasions of the CSI-RS resource can be overlapped with SBFD symbols. Only the occasions within non-SBFD symbols are valid occasions for the CSI-RS resource. The UE derives CSI only within valid occasions of the CSI-RS resource.

In one embodiment, in the configuration of a CSI-RS resource set, the associated SBFD operation type can be configured, i.e., a CSI-RS resource set is for measurement for SBFD operation or non-SBFD operation.

In some aspects, for a CSI-RS resource set for SBFD operation, all occasions of all CSI-RS resources in the set are within SBFD symbols. For a CSI-RS resource for non-SBFD operation, all occasions of all CSI-RS resources in the set should be within non-SBFD symbols.

In some aspects, for a CSI-RS resource set for SBFD operation, some of the occasions of a CSI-RS resource in the set can be within SBFD symbols and some of the occasions of the CSI-RS resource can be overlapped with non-SBFD symbols. Only the occasions within SBFD symbols are valid occasions for the CSI-RS resource.

In some aspects, a UE derives CSI only within valid occasions of the CSI-RS resource. For a CSI-RS resource set for non-SBFD operation, some occasions of a CSI-RS resource can be within non-SBFD symbols and some occasions of the CSI-RS resource can be overlapped with SBFD symbols. Only the occasions within non-SBFD symbols are valid occasions for the CSI-RS resource. In some aspects, the UE derives CSI only within valid occasions of the CSI-RS resource.

In some aspects, a CSI resource setting can consist of one or multiple CSI-RS resource sets. In one option, the CSI-RS resource sets within the same CSI resource setting should be associated with the same SBFD or non-SBFD operation type. In another option, the CSI-RS resource sets within the same CSI resource setting can be associated with the same or different SBFD or non-SBFD operation type.

In one embodiment, in the configuration of a CSI-RS resource, the associated SBFD operation type can be configured, i.e., a CSI-RS resource is for measurement for SBFD operation or non-SBFD operation.

In one option, for a CSI-RS resource for SBFD operation, all occasions of the CSI-RS resource should be within SBFD symbols. For a CSI-RS resource for non-SBFD operation, all occasions of the CSI-RS resource should be within non-SBFD symbols.

In another option, for a CSI-RS resource for SBFD operation, some of the occasions of the CSI-RS resource can be within SBFD symbols and some of the occasions of the CSI-RS resource can be overlapped with non-SBFD symbols. Only the occasions within SBFD symbols are valid occasions for the CSI-RS resource. UE derives CSI only within valid occasions of the CSI-RS resource. For a CSI-RS resource for non-SBFD operation, some occasions of the CSI-RS resource can be within non-SBFD symbols and some occasions of the CSI-RS resource can be overlapped with SBFD symbols. Only the occasions within non-SBFD symbols are valid occasions for the CSI-RS resource. UE derives CSI only within valid occasions of the CSI-RS resource.

In some aspects, a CSI-RS resource set can consist of one or multiple CSI-RS resources. In one option, the CSI-RS resources within the same CSI-RS resource set should be associated with the same SBFD or non-SBFD operation type. In another option, the CSI-RS resources within the same CSI-RS resource set can be associated with the same or different SBFD or non-SBFD operation type. In one example, CSI-RS resources of a resource set can be configured with the same or different starting RB and number of RBs.

In one embodiment, the gNB does not configure SBFD or non-SBFD operation type for a CSI-RS resource/CSI-RS resource set/CSI resource setting. Some of the occasions of the CSI-RS resource can be within SBFD symbols and some of the occasions of the CSI-RS resource can be overlapped with non-SBFD symbols. The UE can derive CSI based on occasions in SBFD symbols and occasions in non-SBFD symbols respectively, or derive CSI based on a combination of occasions in SBFD symbols and occasions in non-SBFD symbols.

In some aspects, the above mechanism can be applied for CSI-RS resource/CSI-RS resource set/CSI resource setting for channel measurement and/or interference measurement. The above mechanism can also be applied to CSI-IM resource or CSI-IM resource set.

If both CSI-RS for channel measurement and CSI-IM resource for interference measurement are configured for CSI reporting, and if both the CSI-RS resource and CSI-IM resource are configured with associated SBFD or non-SBFD operation type, the configured associated SBFD or non-SBFD operation type for a pair of CSI-RS resource and CSI-IM resource is the same. Alternatively, if one of the CSI-RS resources or CSI-IM resource of a pair is configured with an associated SBFD or non-SBFD operation type, the same type is assumed for the CSI-IM resource or CSI-RS resource of a pair.

The above mechanisms can be applied for CSI, beam management, or CLI measurement.

CSI Reporting

Subband CSI Reporting

In a legacy TDD system, a UE can be configured with wideband (WB) or subband (SB) CSI reporting. Frequency granularities of PMI and CQI for CSI reporting can be wideband or subband and the frequency granularity of PMI and CQI are independently configured. In some aspects, the CSI reporting band is configured by RRC signaling, e.g., by csi-ReportingBand, which is a bitmap with a granularity of 1 subband. The subband size $N_{PRB}^{SB}$ can be configured by gNB, e.g., the gNB can configure one out of two possible subband sizes shown in Table 1 below, where a subband is defined as $N_{PRB}^{SB}$ contiguous PRBs and depends on the total number of PRBs in the bandwidth part according to table 1 below. For example, for a BWP with 80 PRBs, the gNB configures the subband size as 16. Then, the gNB can use a 5-bit bitmap csi-ReportingBand to indicate which subbands out of 5 subbands is the CSI reporting subband.

Figure 7:
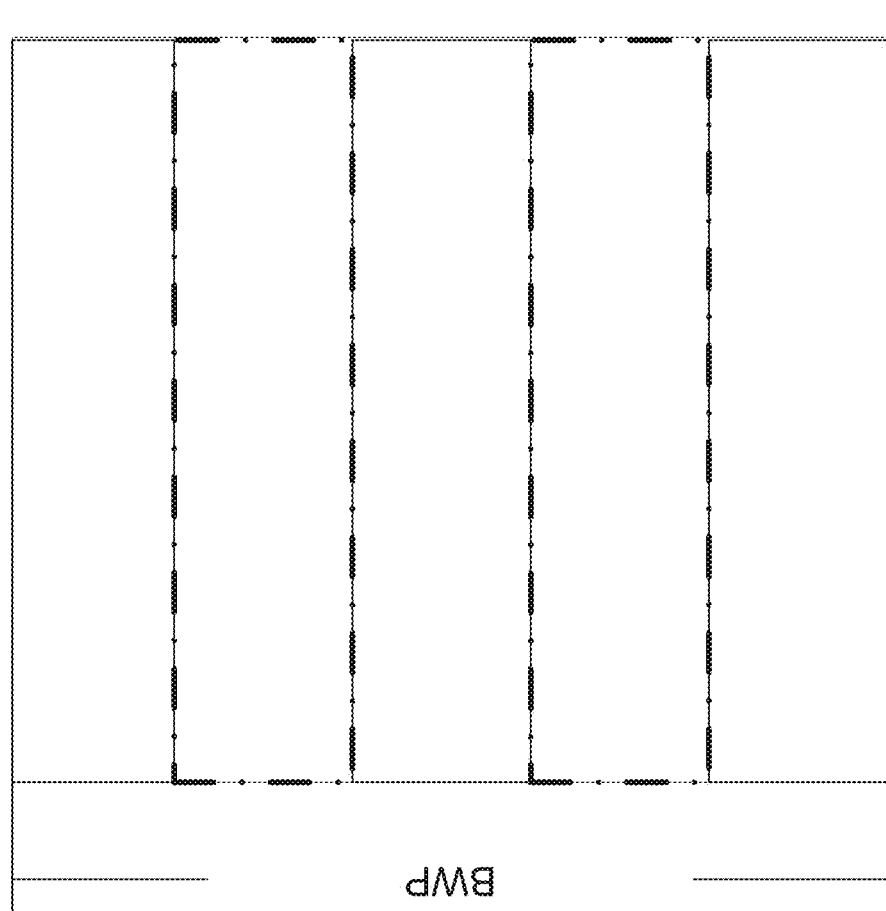
FIG. 7 illustrates csi-ReportingBand indicating 4 subbands as channel state information (CSI) reporting subbands, in accordance with some aspects.

FIG. 7 illustrates diagram 700 of csi-ReportingBand indicating 4 subbands as CSI reporting subbands, in accordance with some aspects. The subbands for a given CSI report indicated by the higher layer parameter csi-ReportingBand are numbered continuously in increasing order with the lowest subband of csi-ReportingBand as subband 0. The first subband size is given by $N_{PRB}^{SB}-(N_{BWP,i}^{start}$ mod $N_{PRB}^{SB})$ and the last subband size is given by $(N_{BWP,i}^{start}+N_{BWP,i}^{size}$ mod $N_{PRB}^{SB}$ if $(N_{BWP,i}^{start}+N_{BWP,i}^{size})$mod $N_{PRB}^{SB}\neq0$ and $N_{PRB}^{SB}$ if $(N_{BWP,i}^{start}+N_{BWP,i}^{size})$mod $N_{PRB}^{SB}=0$, where $N_{BWP,i}^{start}$ is the starting PRB for an active bandwidth, and $N_{BWP,i}^{size}$ is BWP size.

In some aspects, a UE may not expect that a CSI reporting band contains a subband where not all PRBs in the subband have the CSI-IM REs present. Further, a UE may not expect the CSI reporting band to contain a subband where a CSI-RS resource with the frequency density of each CSI-RS port per PRB in the subband is less than the configured density of the CSI-RS resource.

TABLE 1

| Configurable CSI reporting subband sizes $N_{PRB}^{SB}$: | |
|---|---|
| Bandwidth part (PRBs) | Subband size (PRBs) |
| 24-72 | 4, 8 |
| 73-144 | 8, 16 |
| 145-275 | 16, 32 |

Figure 8:
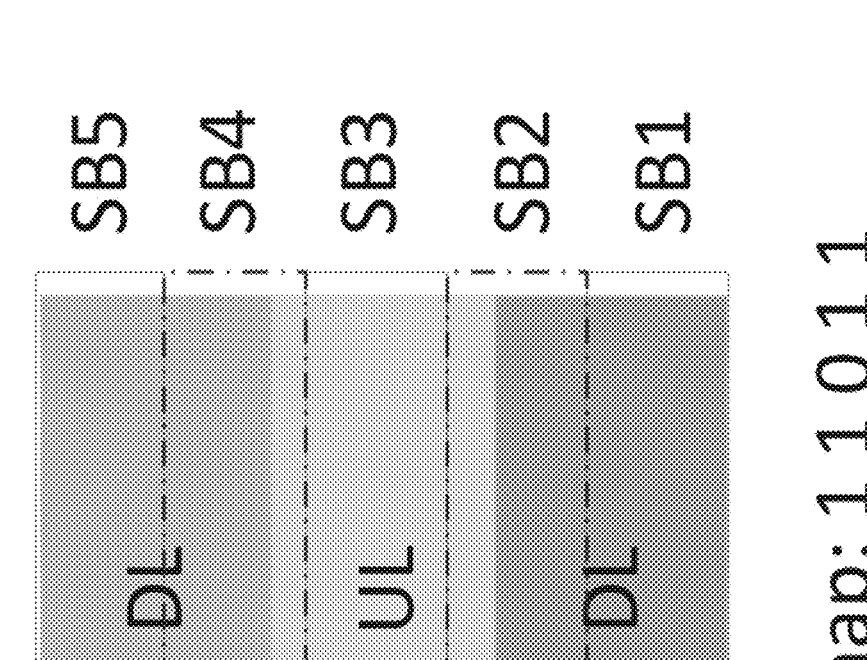
FIG. 8 illustrates CSI reporting subbands partially or fully overlapped with UL subbands in an SBFD symbol, in accordance with some aspects.

FIG. 8 illustrates a diagram 800 of CSI reporting subbands partially or fully overlapped with UL subbands in an SBFD symbol, in accordance with some aspects.

In an SBFD symbol, within a BWP, there can be both DL and UL subbands. Based on the existing CSI reporting subband configuration, a CSI reporting subband may fall into the UL subband, e.g., subband 3 shown in FIG. 8, or overlap with both DL and UL subband, e.g., subband 4 and subband 2 in FIG. 8. Assuming CSI-RS and CSI-IM resources are fully confined within DL subbands, consequently, subband 2 and subband 4 are subbands where not all PRBs in the subband have the CSI-IM REs and also for CSI-RS, which would be treated as an error case. In addition, for subband 2 and subband 4, it may not be reasonable for a UE to measure CSI in PRBs in UL subbands. Therefore, the disclosed techniques may be used to handle CSI reporting subbands in SBFD symbols. In the following, the CSI reporting can be CQI/PMI/RI/SINR/Interference reporting.

Figure 9:
FIG. 9 and FIG. 10 illustrate the base station configuration of a list of number of PRBs, in accordance with some aspects.
Figure 9:
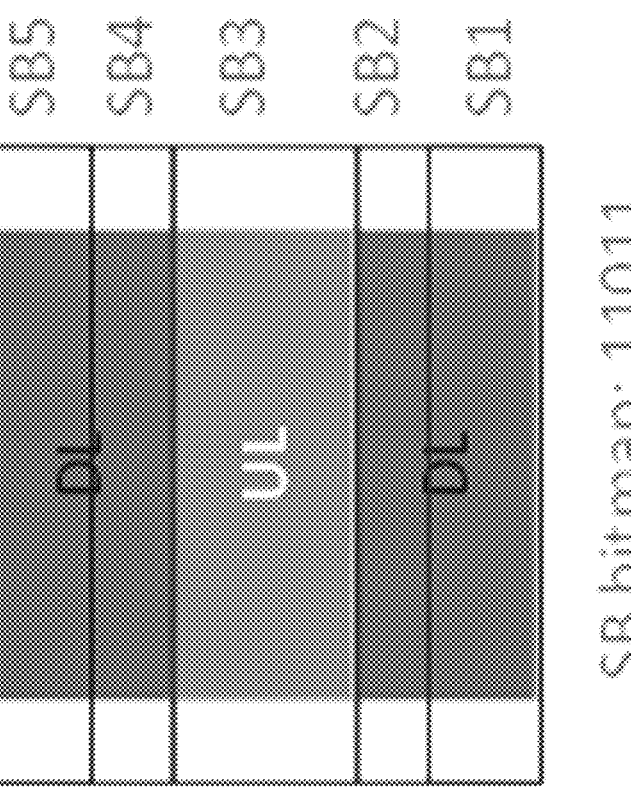
Figure 10:
Figure 10:
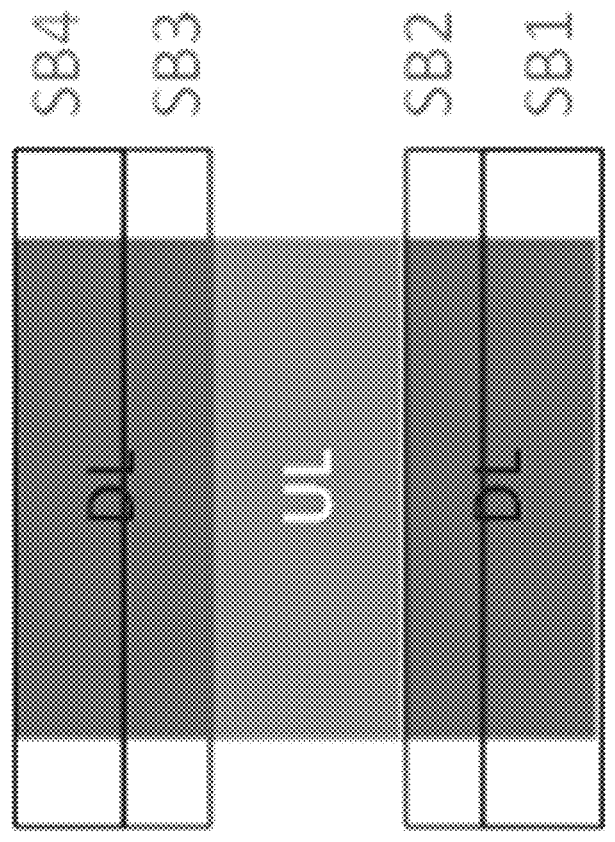

FIG. 9 and FIG. 10 illustrate corresponding diagrams 900 and 1000 of base station configuration of a list of the number of PRBs, in accordance with some aspects.

In one embodiment, a UE may be configured with a list of the number of PRBs and a bit map to indicate CSI reporting subbands, wherein each number of PRBs is associated with one reporting subband. For example, in FIG. 9, gNB configures a list of 5 numbers of PRBs (X1, X2, X3, X4, X5, where Xi is the number of PRBs for i-th CSI subband and the value of Xi can be different in the list) and a 5-bit bitmap. For the list of 5 numbers of PRBs, each number indicates a subband size for a subband, and the 5-bit bitmap is similar to csi-ReportingBand to indicate which subbands out of 5 subbands are for CSI reporting. The start of 1st subband is the lowest PRB for the active DL BWP, and all subbands are contiguous in the frequency domain so that the starting PRB for 2nd subband is determined by the number of PRBs for 1st subband.

Alternatively, the gNB can configure a list of starting PRBs and the number of PRBs for CSI reporting subbands. For example, in FIG. 10, the gNB configures a list of 4 (starting PRB, number of PRBs) for 4 subbands. In some aspects, these 4 subbands can be non-contiguous in the frequency domain.

In some embodiments, a UE may not expect a subband of CSI reporting subbands for a CSI report to overlap with a UL subband. In another option, the UE may expect a subband of CSI reporting subbands for a CSI report to overlap with the UL subband, and the UE either does not report CSI on such subband or UE derives CSI for the subband based on PRBs within DL subbands. In some aspects, the UE may expect a subband of CSI reporting to overlap with the UL subband, and UE derives CSI for the subband based on available CSI-RS resources. For example, the gNB may trigger an A-CSI-RS in a semi-statically configured SBFD symbol, and the A-CSI-RS overlaps with the UL subband because gNB may schedule DL transmission in at least part of the UL subband. Specifically, the gNB may want to turn the SBFD symbol into a legacy DL symbol. Then, the UE assumes all PRBs for A-CSI-RS indicated by gNB is available, and the UE can derive CSI for the CSI subband based on available A-CSI-RS resource within the CSI subband.

In some embodiments, CSI reporting subbands may be configured by the bitmap as csi-ReportingBand and the subband locations are derived by csi-ReportingBand, $N_{PRB}^{SB}$, BWP starting PRB and bandwidth ($N_{BWP,i}^{start}$, $n_{BWP,i}^{size}$). For a CSI subband, if the subband includes a first set of PRBs associated with CSI-RS/CSI-IM resources and a second set of PRBs not associated with CSI-RS/CSI-IM resources, the CSI for the subband is only calculated based on the available CSI-RS/CSI-IM resources. Alternatively, for a CSI subband, if the subband includes at least one PRB of a UL subband, the CSI for the subband is calculated for PRBs within DL subbands, excluding the PRBs overlapping with a UL subband. In other words, it is allowed for a CSI subband to include PRBs in a UL subband, but the CSI is only based on PRBs within DL subbands.

For example, in FIG. 8, csi-ReportingBand indicates bitmap 11011, so the CSI reporting subbands include subband [1, 2, 4, 5]. For subband 2 and subband 4, UE derives CSI for subband 2 and subband 4 based on PRBs within DL subbands.

In some aspects, CSI reporting subbands may be configured by the bitmap as csi-ReportingBand and the subband locations may be derived by csi-ReportingBand, $N_{PRB}^{SB}$, and DL subbands starting PRB and bandwidth ($N_{DL,subband}^{start}$, $N_{DL,subband}^{size}$). Within a BWP, there can be multiple groups of CSI reporting subbands. Each group can be within a DL subband, and candidate CSI reporting subbands within the group are continuous while actual CSI reporting subbands are determined by existing bitmap.

Figure 11:
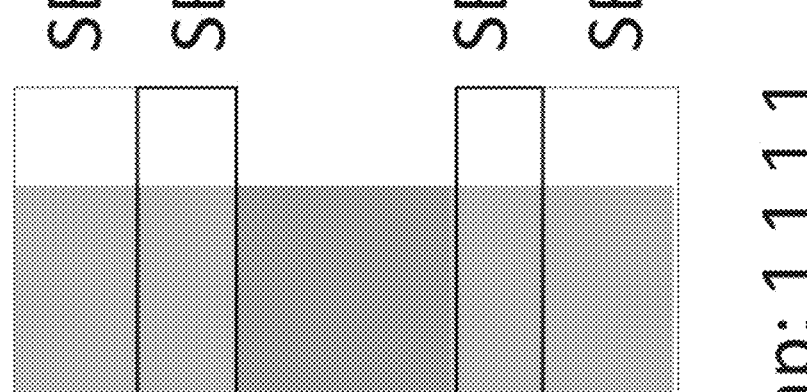
FIG. 11 illustrates an example of subband indication for CSI reporting subbands, in accordance with some aspects.
Figure 11:

FIG. 11 illustrates diagram 1100 of an example of subband indication for CSI reporting subbands, in accordance with some aspects. For example, in FIG. 11, in an SBFD symbol, there are two DL subbands, with $N_{DL,subband,1}^{start}$, $N_{DL,subband,1}^{size}$ $N_{DL,subband,2}^{start}$, $N_{DL,subband,2}^{size}$ respectively. Within a group in the i-th DL subband, the first subband size in the DL subband is given by $N_{PRB}^{SB}-$($N_{DL\ subband,i}^{start}$ mod $N_{PRB}^{SB}$) and the last subband size in the DL subband given by ($N_{DL\ subband,i}^{start}+N_{DL\ subband,i}^{size}$) mod $N_{PRB}^{SB}$ if ($N_{DL\ subband,i}^{start}+N_{DL\ subband,i}^{size}$)mod $N_{PRB}^{SB}\neq0$ and $N_{PRB}^{SB}$ if ($N_{DL\ subband,i}^{start}+N_{DL\ subband,i}^{size}$) mod $N_{PRB}^{SB}=0$. As shown in FIG. 11, in each DL subband, there are two CSI reporting subbands. For another example, if the DL subband size is no larger than the CSI subband size derived above, the CSI subband size is determined by the DL subband size.

Figure 12:
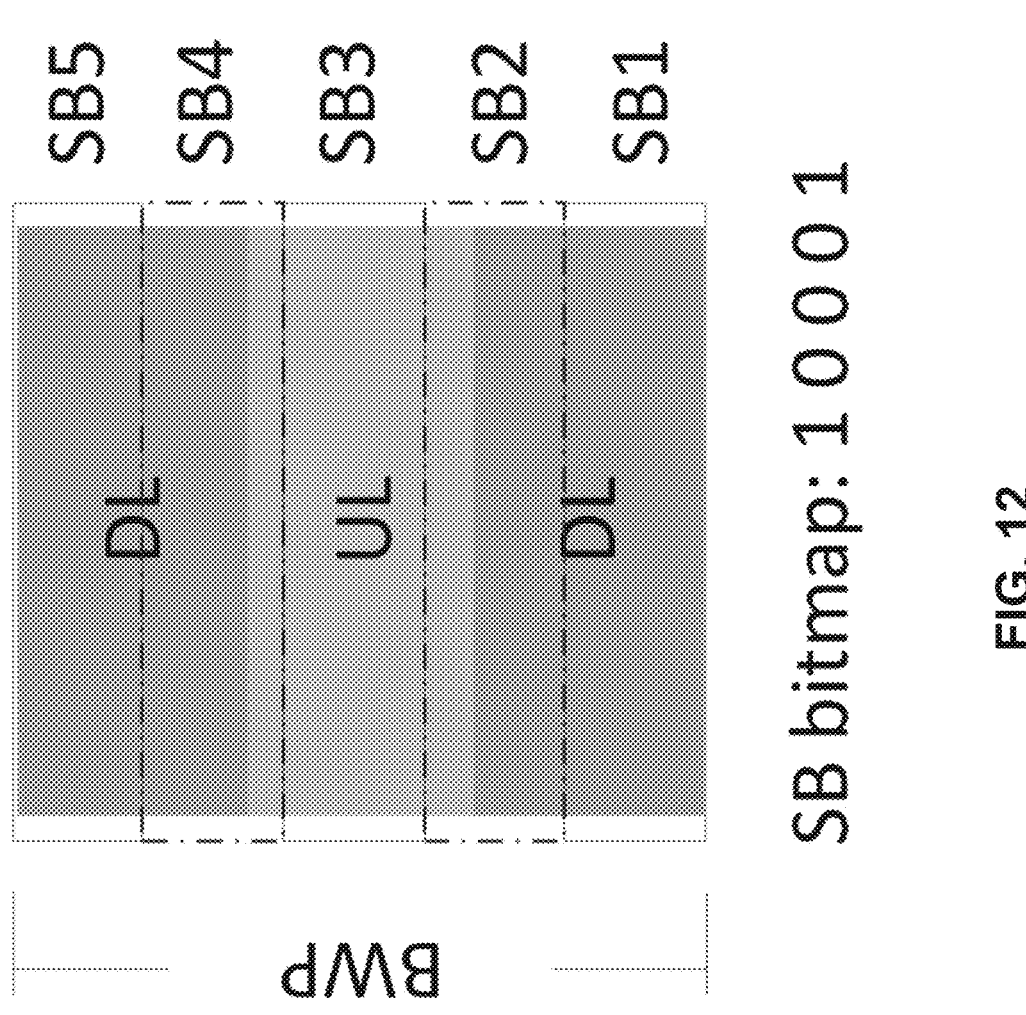
FIG. 12 illustrates an example of subband indication for CSI reporting subbands, in accordance with some aspects.

FIG. 12 illustrates diagram 1200 of an example of subband indication for CSI reporting subbands, in accordance with some aspects. In one embodiment, CSI reporting subbands may be configured by the bitmap as csi-ReportingBand and the subbands locations may be derived by csi-ReportingBand, $N_{PRB}^{SB}$, and BWP starting PRB and bandwidth ($N_{BWP,i}^{start}$, $N_{BWP,i}^{size}$). A UE does not expect a subband of CSI reporting subbands for a CSI report to overlap with the UL subband. For example, in FIG. 12, the csi-ReportingBand bitmap cannot indicate '1' for any subband of subband 2, 3, or 4.

In some aspects, a UE may be configured with one out of two possible subband sizes shown in Table 1 above, where a subband is defined as $N_{PRB}^{SB}$ contiguous PRBs and depends on the total number of PRBs in the DL subbands in an SBFD symbol. For example, for a DL BWP with 200 PRBs and DL subbands within DL BWP only has 120 PRBs, $N_{PRB}^{SB}$ is one of 8 or 16 PRBs according to the 2nd row in Table 1, replacing the 'bandwidth part' with DL subbands. In one option, if a DL subband with a subband size smaller than 24 PRBs is configured, $N_{PRB}^{SB}$ for 24-72 PRBs can be reused. In another option, if a DL subband with a subband size smaller than 24 PRBs is configured, a separate $N_{PRB}^{SB}$ can be defined, e.g., $N_{PRB}^{SB}$ can be 2 or 4.

In one embodiment, the configuration of CSI reporting subbands for different CSI reports may be different. For example, gNB may use a legacy mechanism to configure CSI reporting subbands for a CSI report n and one of the above new mechanisms to configure CSI reporting subbands for a CSI report m.

In some aspects, the gNB can configure a UE to report N1 CQI and/or RI values and N2 PMI values for a CSI reporting subband, where N1 is the number of CQI and/or RI values and N2 is the number of PMI values. In some aspects, N1 values of CQI and/or RI can be based on multiple measurement resources, with different interference hypotheses, e.g., based on N1 measurement resources within a subband. In some aspects, N1 can be larger or smaller than N2, or equal to N2. For example, considering the same channel fading within a subband but different UL-to-DL subband interference within the subband, gNB can configure N1>N2.

In one option, a UE is configured with two CSI-RS resources and two CSI-IM resources, the first CSI-RS resource and the first CSI-IM resource are for non-SBFD operation, and the second CSI-RS resource and the second CSI-IM resource are for SBFD operation. For a CSI report, N1=2 CQI and/or RI values and N2=1 PMI value are reported. All CQI and/or RI values in the report are conditioned on the reported PMI value. The first CQI and/or RI value is determined based on channel and interference measured from CSI-RS and CSI-IM for non-SBFD operation respectively, the second CQI and/or RI value is determined based on channel and interference measured from CSI-RS and CSI-IM for SBFD operation, respectively. In some aspects, PMI is determined based on CSI-RS for non-SBFD operations.

In some aspects, a UE is configured with one CSI-RS resource and two CSI-IM resources, the CSI-RS resource and the first CSI-IM resource are for non-SBFD operation, and the second CSI-IM resource is for SBFD operation. For a CSI report, N1=2 CQI and/or RI values and N2=1 PMI value are reported. All CQI and/or RI values in the report are conditioned on the reported PMI value. In some aspects, the first CQI and/or RI value is determined based on interference measured from CSI-IM for non-SBFD operation, and the second CQI and/or RI value is determined based on interference measured from CSI-IM for SBFD operation. In some aspects, PMI, CQI, and RI are determined based on CSI-RS for non-SBFD operations.

In the above options, if two RI values are different, PMI corresponds to the larger RI. For the CQI calculation corresponding to the lower RI=RIL, the RIL columns of the PMI are used as a precoding matrix.

CSI Resource Linkage

Figure 13:
FIG. 13 illustrates CSI calculation based on more than one CSI-RS resource, in accordance with some aspects.
Figure 13:
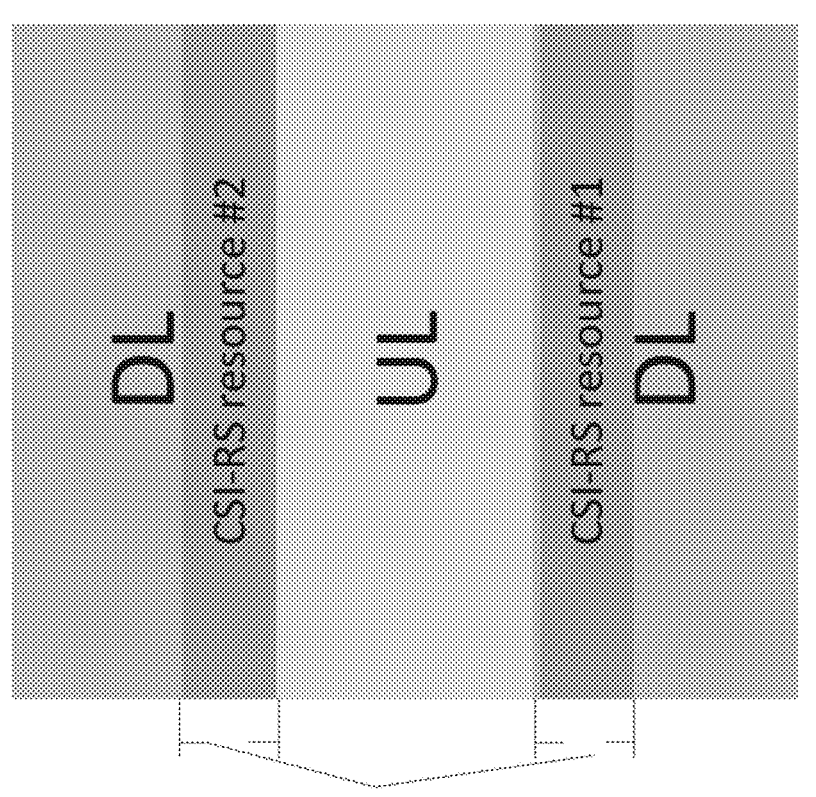

FIG. 13 illustrates diagram 1300 of CSI calculation based on more than one CSI-RS resource, in accordance with some aspects.

In one embodiment, the gNB can configure multiple CSI-RS resources and configure the CSI-RS resources for the same CSI reporting. For example, as shown in FIG. 13, the gNB configures 2 CSI-RS resources in 2 DL subbands based on existing CSI-RS frequency resource allocation. The gNB configures the linkage between these two CSI-RS resources which can be treated as a single combined CSI-RS resource. Then, the UE derives a single CSI result, if wideband CSI reporting is configured. If subband CSI reporting is configured, one of the above embodiments can be applied to determine the CSI reporting subbands.

In some aspects, within one CSI-RS resource set, one CSI-RS resource can be linked with another CSI-RS resource in the same set.

In some aspects, more than one CSI-RS resource can be configured with the same resource ID. For example, if two CSI-RS resources are associated with SBFD operation type, and at least some parameters configured for each CSI-RS are the same, e.g., the two CSI-RS resources are configured with the same parameters for each CSI-RS resource except different frequency resource, and the frequency resource for the two CSI-RS resources are non-overlapped, the two CSI-RS resources can be configured with same resource ID. One CSI is derived based on the CSI-RS resources with the same resource ID. For another example, if two CSI-RS resources are associated with the same SBFD or non-SBFD operation type, and at least some parameters configured for each CSI-RS are the same, the two CSI-RS resources can be configured with the same resource ID. For another example, for two CSI-RS resources, if at least some parameters configured for each CSI-RS are the same, the two CSI-RS resources can be configured with the same resource ID. The two CSI-RS resources are to be measured for the same SBFD or non-SBFD operation, e.g., according to a CSI-RS resource set, a CSI resource setting, or a CSI reporting configuration.

In another example, in the configuration of a CSI-RS resource, a linked CSI-RS resource ID can be configured. One CSI is derived based on the linked CSI-RS resources. For one example, the linked CSI-RS resources are for SBFD operation. For another example, the linked CSI-RS resources are for the same SBFD or non-SBFD operation.

In another example, in the configuration of a CSI-RS resource set, the pairing of multiple CSI-RS resources can be configured. For example, gNB can configure the pairing as below so that NZP-CSI-RS resource 1 and NZP-CSI-RS resource 2 are linked. In one CSI-RS resource set, N pairs can be configured, where N=1 or N>1. Each of the N Resource pairs is associated with a CRI value. For example, the following information element can be used:

```
NZP-CSI-RS-Pairing-r18 ::=        SEQUENCE {
    nzp-CSI-RS-ResourceId1-r18        INTEGER (1..X),
    nzp-CSI-RS-ResourceId2-r18        INTEGER (1..X)
}
```

For CSI-RS resources in one pair, at least some parameters for the CSI-RS resources can be the same, e.g., the number of ports, and/or powerControlOffset, and/or in the same symbols/same slot.

If the UE is also configured with CSI-IM resources, similarly, in the configuration of a CSI-IM resource set, the pairing of multiple CSI-IM resources can be configured. The resource pairs for channel measurement in the CSI-RS resource set and resource pairs for interference measurement in the CSI-IM resource set are pair-wise associated.

UE may assume that the linked CSI-RS resources are quasi-co-located (QCLed) with respect to 'typeD'.

In one option, in one CSI resource setting, one CSI-RS resource can be linked with another CSI-RS resource in the same setting.

In one example, more than one CSI-RS resource set can be configured with the same resource set ID.

In another example, in the configuration of a CSI-RS resource set, a linked CSI-RS resource set ID can be configured. For both options, in one example, if two CSI-RS resource sets are linked, the number of CSI-RS resources in each resource set is the same. The CSI-RS resource in different CSI-RS resource sets can be resource-wise linked in order. In another example, the number of CSI-RS resources in each resource set can be different. First L CSI-RS resources in different CSI-RS resource sets can be resource-wise linked in order, L is the minimum number of CSI-RS resources of each CSI-RS resource set, which is linked.

In another example, in the configuration of a CSI resource setting, the paring of multiple CSI-RS resource sets can be configured.

In one option, in one CSI reporting configuration, one CSI resource setting can be linked with another CSI resource setting in the same reporting.

In one example, more than one CSI resource setting can be configured with the same resource setting ID.

In another example, in the configuration of a CSI resource setting, a linked CSI resource setting ID can be configured.

In another example, in the configuration of CSI reporting, the pairing of multiple CSI resource settings can be configured.

In some aspects, CSI-RS resources in different CSI resource settings can be resource-wise linked in the corresponding resource sets in different CSI resource settings. In one example, if two CSI resource setting is linked, the number of CSI-RS resources in each resource set and the number of CSI-RS resource set in each CSI resource setting is the same. CSI-RS resources in different CSI resource settings can be resource-wise and resource-set-wise linked in order. In another example, if two CSI resource settings are linked, each CSI resource setting only has one CSI-RS resource set. The number of CSI-RS resources in each CSI resource setting can be the same or different. If the number of CSI-RS resources in each CSI resource setting is different, first L CSI-RS resources in different CSI resource settings can be resource-wise linked in order, L is the minimum number of CSI-RS resources of each CSI resource setting, which is linked.

For the above embodiments, the CSI reporting configuration can be configured per BWP and can be configured for the SBFD symbol and non-SBFD symbol, respectively.

For the above embodiments, the CSI reporting subband configuration and determination mechanism can be configured/applied to SBFD UE only. Alternatively, the CSI reporting subbands configuration and determination mechanism can be configured/applied to SBFD or non-SBFD UE per gNB decision. For example, the mechanism depending on the knowledge of the DL/UL subband is only applicable to SBFD UE. Here, a "SBFD UE" is referred to as a UE that may be configured with SBFD operation or SBFD-based resource allocation.

CSI Reporting for SBFD and Non-SBFD

As provided above, the CSI reporting configuration can be configured for SBFD symbols and non-SBFD symbols, respectively.

In one embodiment, in the configuration of a CSI reporting, the associated SBFD operation type can be configured, i.e., a CSI reporting is for SBFD operation or non-SBFD operation.

In one option, a CSI-RS resource configured for a CSI reporting configured with SBFD or non-SBFD operation is configured with the same SBFD or non-SBFD operation type of the CSI reporting. For example, in a CSI-RS resource configuration, a CSI-RS resource set configuration, or a CSI resource setting configuration for CSI reporting, the SBFD or non-SBFD operation is configured, which is the same as that configured for the CSI reporting.

For a CSI-RS resource or CSI-RS resource set or CSI resource setting configured with SBFD or non-SBFD operation, all occasions of a CSI-RS resource for a CSI reporting with an SBFD or non-SBFD operation type can be confined within the corresponding symbol type, i.e., confined within SBFD symbols, or confined with non-SBFD symbols. Alternatively, some occasions of a CSI-RS resource can be within SBFD symbols and some occasions of the CSI-RS resource can be overlapped with non-SBFD symbols. Only the occasions within SBFD symbols are valid occasions for the CSI-RS resource for a CSI reporting for SBFD operation, and only the occasions within non-SBFD symbols are valid occasions for the CSI-RS resource for a CSI reporting for non-SBFD operation. In some aspects, the UE derives CSI only within valid occasions of the CSI-RS resource for corresponding CSI reporting.

In some aspects, for a CSI-RS resource or CSI-RS resource set or CSI resource setting for a CSI reporting configured with SBFD or non-SBFD operation, there is no separate configuration for SBFD or non-SBFD for the CSI-RS resource or the CSI-RS resource set or the CSI resource setting. In some aspects, the CSI result for a CSI reporting for SBFD operation is derived from occasions of CSI-RS resources which are confined in SBFD symbols. In some aspects, the CSI result for a CSI reporting for non-SBFD operation is derived only from occasions of CSI-RS resources which are confined in non-SBFD symbols. In one example, the same CSI-RS resource or CSI-RS resource set of CSI resource setting can be configured for different CSI reporting associated with different SBFD or non-SBFD operation types. The UE uses separate occasions that are confined in different symbol types (SBFD or non-SBFD symbol) of the same CSI-RS resource for the different CSI reporting.

For options above, for an aperiodic CSI reporting based on aperiodic CSI-RS resources, the UE can report CSI for aperiodic CSI-RS resources that are in SBFD symbols and omit CSI report for aperiodic CSI-RS resources that are in non-SBFD symbols, if the triggered aperiodic CSI reporting is associated with SBFD operation. In some aspects, the UE can report CSI for aperiodic CSI-RS resources that are in non-SBFD symbols and omit CSI report for aperiodic CSI-RS resources that are in SBFD symbols, if the triggered aperiodic CSI reporting is associated with non-SBFD operation. By one CSI request, UE does not expect multiple aperiodic CSI reports associated with the CSI request to be different. Alternatively, by one CSI request, the UE may expect multiple aperiodic CSI reports associated with the CSI request to be different.

In one embodiment, the associated SBFD operation type for CSI reporting is derived by CSI-RS resource or CSI-RS resource set or CSI resource setting. In one example, a CSI-RS resource of CSI-RS resource set of CSI resource setting is configured with associated SBFD operation type, and the SBFD operation type is the same for all CSI-RS resource or CSI-RS resource set of CSI resource setting for a CSI reporting. The associated SBFD operation type for CSI reporting is derived by the SBFD operation type configured for the CSI-RS resource or CSI-RS resource set or CSI resource setting for the CSI reporting.

In one embodiment, the gNB can configure or not configure a specific associated SBFD or non-SBFD operation type for CSI reporting. If the gNB does not configure any SBFD or non-SBFD operation type for CSI reporting, the CSI reporting can include both CSI for SBFD and non-SBFD operation. For example, the gNB does not configure any SBFD or non-SBFD operation type for a CSI reporting or CSI-RS resource/CSI-RS resource set/CSI resource setting, both occasions of CSI-RS resources in SBFD symbol or non-SBFD symbols can be used to derive CSI for a CSI reporting.

In one embodiment, in the configuration of a CSI reporting, if both SBFD and non-SBFD are configured, the UE can report one CSI based on the first CSI-RS resource in SBFD symbols and another CSI based on the second CSI-RS resource in non-SBFD symbols in the same CSI report. In some aspects, the first and second CSI-RS resource is the same, the UE can report one CSI based on occasions of the CSI-RS resource in SBFD symbols and another CSI based on occasions of the CSI-RS resource in non-SBFD symbols in the same CSI report. In some aspects, the first and second CSI-RS resources can be different, e.g., the first CSI-RS resource is a CSI-RS resource configured for SBFD, and the second CSI-RS resource is a CSI-RS resource configured for non-SBFD.

The above techniques can be applied for CSI-RS resource/CSI-RS resource set/CSI resource setting for channel measurement and/or interference measurement. The above techniques can also be applied to CSI-IM resource or CSI-IM resource set. The above techniques can be applied for CSI reporting or CLI reporting.

CSI Reference Resource

To derive CSI, the CSI reference resource for a serving cell is defined herein. In the time domain, the CSI reference resource for a CSI reporting in uplink slot n is defined by a single downlink slot $n-n_{CSI\_ref}-K_{offset}$, where $n_{CSI\_ref}$ is to ensure sufficient processing time for the CSI report to find a valid DL slot, and $K_{offset}$ is pre-defined or configured with additional offset.

In one embodiment, for a valid DL slot, a CSI reference resource can be determined according to the associated SBFD operation type for the CSI reporting (SBFD or non-SBFD operation).

In some aspects, a slot is considered to be an invalid downlink slot for CSI reference resource of a CSI report for SBFD operation, if the slot comprises at least one higher layer configured non-SBFD symbol, or the slot does not comprise any SBFD symbol. For example, a slot in a serving cell can be considered to be a valid downlink slot for CSI reference resource of a CSI report for SBFD operation, if the slot:

(a) comprises at least one higher layer configured SBFD symbol; and (b) does not fall within a configured measurement gap for that UE.

In some aspects, a slot is considered to be an invalid downlink slot for CSI reference resource of a CSI report for non-SBFD operation, if the slot comprises at least one higher layer configured SBFD symbol, or the slot does not comprise any non-SBFD symbol. For example, a slot in a serving cell shall be considered to be a valid downlink slot for CSI reference resource of a CSI report for non-SBFD operation, if the slot:

(a) comprises at least one higher layer configured non-SBFD symbol; and (b) does not fall within a configured measurement gap for that UE.

In some aspects, if a CSI report is neither configured with SBFD nor non-SBFD operation, a slot is considered to be a valid downlink slot for the CSI reference resource of the CSI report, if the slot:

(a) comprises at least one higher layer configured downlink or flexible symbol; and (b) does not fall within a configured measurement gap for that UE.

In one embodiment, for a valid DL slot, a CSI reference resource can be determined regardless of SBFD or non-SBFD symbols. For example, a slot in a serving cell shall be considered to be a valid downlink slot if the slot:

(a) comprises at least one higher layer configured downlink or flexible symbol; and (b) does not fall within a configured measurement gap for that UE.

In the frequency domain, the CSI reference resource is defined by the group of DL PRBs corresponding to the band to which the derived CSI relates.

In one embodiment, for a CSI report for SBFD operation, the CSI reference resource is defined by the group of DL PRBs corresponding to the band to which the derived CSI relates and the DL PRBs are within DL subband(s).

In one embodiment, if configured to report the CQI index, in the CSI reference resource, the UE can assume a PDSCH in the bandwidth configured for the corresponding CQI report and the bandwidth does not include PRBs outside DL subband(s), if the CQI report is for SBFD operation.

For example, in FIG. 13, assuming 5 CSI reporting subbands and gNB configures subbands 1, 2, 4, and 5 for CSI reporting. Subband 2 and Subband 4 are partially overlapped with UL subband. The UE can assume a PDSCH in subband 2 in PRBs in subband 2 and within the DL subband. Similarly, the UE shall assume a PDSCH in subband 4 in PRBs in subband 4 and within the DL subband.

CLI Reporting

Subband CLI Reporting

Similar to CSI reporting, subband-based CLI reporting (e.g., L3 CLI reporting) may also be supported. The above mechanisms for subband-based CSI reporting can be reused for CLI reporting subband.

In some aspects, the CLI reporting subband can be configured per BWP.

In another embodiment, the CLI reporting subband can be configured per serving carrier (serving cell) for a UE.

In some aspects, the subbands for a given CLI report indicated by a higher layer parameter CLI-ReportingBand are numbered continuously in increasing order with the lowest subband of CLI-ReportingBand as subband 0. The first subband 0 starts from the starting PRB of a carrier according to a reference SCS. The first subband size is given by $N_{PRB}^{SB}-(N_{carrier,i}^{start} \bmod N_{PRB}^{SB})$ and the last subband size is given by $(N_{carrier,i}^{start}+N_{carrier,i}^{size}) \bmod N_{PRB}^{SB}$ if $(N_{carrier,i}^{start}+N_{carrier,i}^{size}) \bmod N_{PRB}^{SB} \neq 0$ and $N_{PRB}^{SB}$ if $(N_{carrier,i}^{start}+N_{carrier,i}^{size}) \bmod N_{PRB}^{SB}=0$. Alternatively, the CLI reporting subband is determined based on the configured measurement frequency resources. The first subband 0 starts from the lowest PRB of the configured measurement frequency resource and the last subband ends at the highest PRB of the configured measurement frequency resource.

In one option, the gNB can configure one out of two possible subband sizes shown in Table 1 above, where a subband is defined as $N_{PRB}^{SB}$ contiguous PRBs and depends on the total number of PRBs in the carrier. In another option, gNB can configure one out of two possible subband sizes shown in Table 1 above, where a subband is defined as $N_{PRB}^{SB}$ contiguous PRBs and depends on the total number of PRBs in the DL subbands in an SBFD symbol.

Figure 14:
FIG. 14 illustrates L3 cross-link interference (L3-CLI) reporting subbands, in accordance with some aspects.
Figure 14:
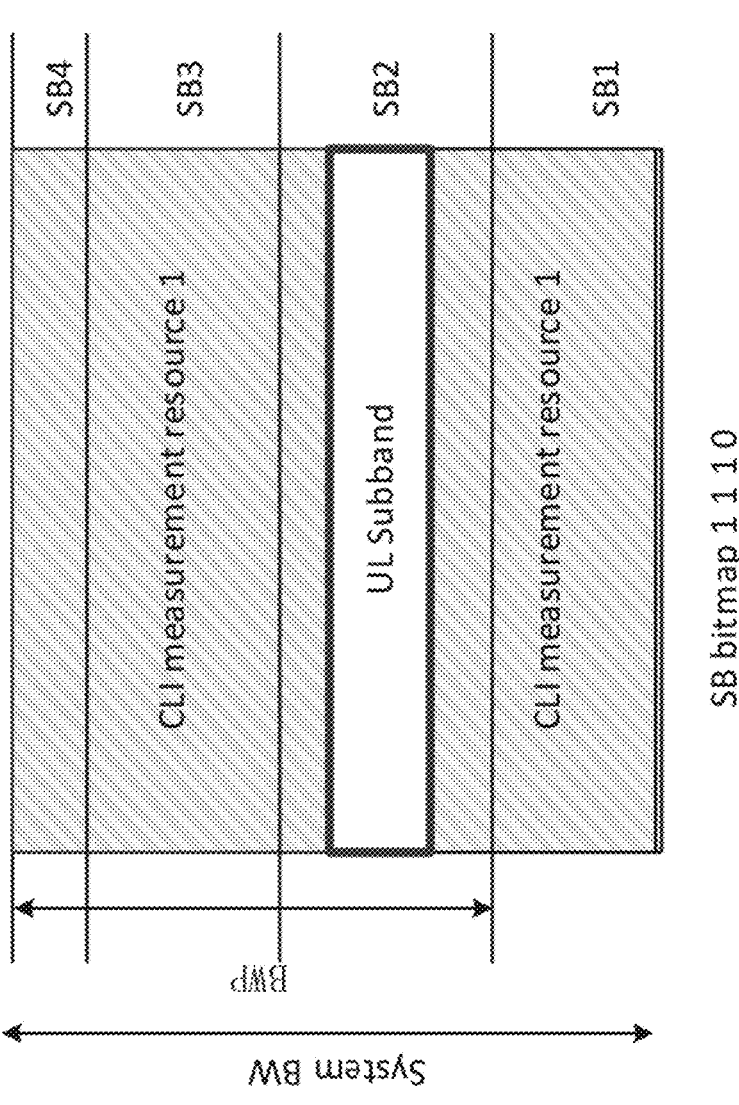

FIG. 14 illustrates a diagram 1400 of L3 cross-link interference (L3-CLI) reporting subbands, in accordance with some aspects.

In some aspects, the UE only reports CLI for subbands within the active BWP, and the subbands do not overlap with the UL subband. In another option, the UE only reports CLI for subbands within the active BWP. If the subband overlaps with the UL subband, CLI for the subband is only calculated for PRBs within DL subbands. In another option, the UE only reports CLI for subbands within the active BWP and with valid CLI resources. For example, a CLI resource included within a DL subband may be considered a valid CLI resource. FIG. 14 provides an example. gNB indicates CLI reporting subbands which includes subband 1, 2, 3 within a carrier, and subband 2, 3 is within the active BWP. The UE reports CLI for subband 2 and subband 3. For subband 2, UE calculates CLI based on CLI measurement resources within subband 2.

CLI Reporting for SBFD and Non-SBFD

Similar to CSI reporting, CLI reporting can be configured for the SBFD symbol and non-SBFD symbol, respectively.

In one embodiment, in the configuration of a CLI reporting, the associated SBFD operation type can be configured, i.e., a CLI reporting is for SBFD operation or non-SBFD operation.

In some aspects, a CLI resource configured for a CLI reporting configured with SBFD or non-SBFD operation is configured with the same SBFD or non-SBFD operation type of the CLI reporting.

In some aspects, the associated SBFD operation type for CLI reporting is derived from CLI resources.

In some aspects, the CLI reporting can be CLI reporting by the UE, e.g., for UE-to-UE CLI mitigation. Alternatively, the CLI reporting can be CLI reporting by a gNB, e.g., for gNB-to-gNB CLI mitigation.

The disclosed techniques can be used as systems and methods of DL reception and UL transmission in a full duplex communication system comprising operating, by a gNB, transmit DL and receive UL for different UEs in the same symbol in the same carrier. The disclosed techniques can include receiving or transmitting, by a UE, in the symbol.

In some aspects, the UE measures CSI or CLI at least in the symbol.

In some aspects, the UE reports subband CSI in a CSI reporting or subbands CLI in a CLI reporting, where the CSI/CLI subband is determined by at least one of the configured CSI/CLI subband information, DL/UL subband information, DL/UL BWP, and measurement resources.

In some aspects, the measurement resources can be CSI-RS resources, CSI-IM resources, CLI-RSSI resources, CLI-RSRP resources, and SRS resources.

In some aspects, the configured CSI/CLI subband information provides a list of the number of PRBs and a bit map to indicate CSI/CLI reporting subbands, wherein each number of PRBs is associated with one reporting subband.

In some aspects, the configured CSI/CLI subband information provides a list of starting PRBs and the number of PRBs for CSI/CLI reporting subbands.

In some embodiments, the CSI/CLI subband is determined by PRBs within the CSI/CLI subband which is associated with available measurement resources.

In some embodiments, the CSI/CLI subband is determined by DL/UL BWP, and the CSI/CLI for the subband is calculated based on the available measurement resources.

In some embodiments, the CSI/CLI subband is determined by PRBs within DL subbands.

In some embodiments, the CSI/CLI subband is determined by DL/UL BWP, and CSI/CLI for the subband is calculated based on PRBs within DL subbands.

In some embodiments, the CSI/CLI subband size $N_{PRB}^{SB}$ is determined by the total number of PRBs in the DL subbands.

In some aspects, the UE reports CSI in a CSI reporting or CLI in a CLI reporting, where the CSI reporting or CLI reporting is associated with SBFD or non-SBFD purposes.

In some aspects, the CSI reporting or CLI reporting is configured with CSI resources, or CLI resources associated with the same SBFD or non-SBFD purpose.

In some embodiments, the CSI reporting or CLI reporting is configured with CSI resource or CLI resource, where occasions of CSI resource or CLI resource in SBFD symbols are used for deriving CSI or CLI for the CSI reporting or CLI reporting configured with SBFD purpose, and occasions of CSI resource or CLI resource in SBFD symbols are used for deriving CSI or CLI for the CSI reporting or CLI reporting configured with non-SBFD purpose.

In some aspects, for a CSI reporting configured with SBFD purposes, the CSI reference resource for the CSI report is determined by a valid slot configured with SBFD operation, and/or determined by the bandwidth as configured for CSI reporting excluding PRBs outside DL subbands.

In some aspects, the CSI resource or CLI resource is configured with SBFD or non-SBFD purpose per CSI-RS or CLI resource, per CSI-RS resource set, or per CSI resource setting set.

Figure 15:
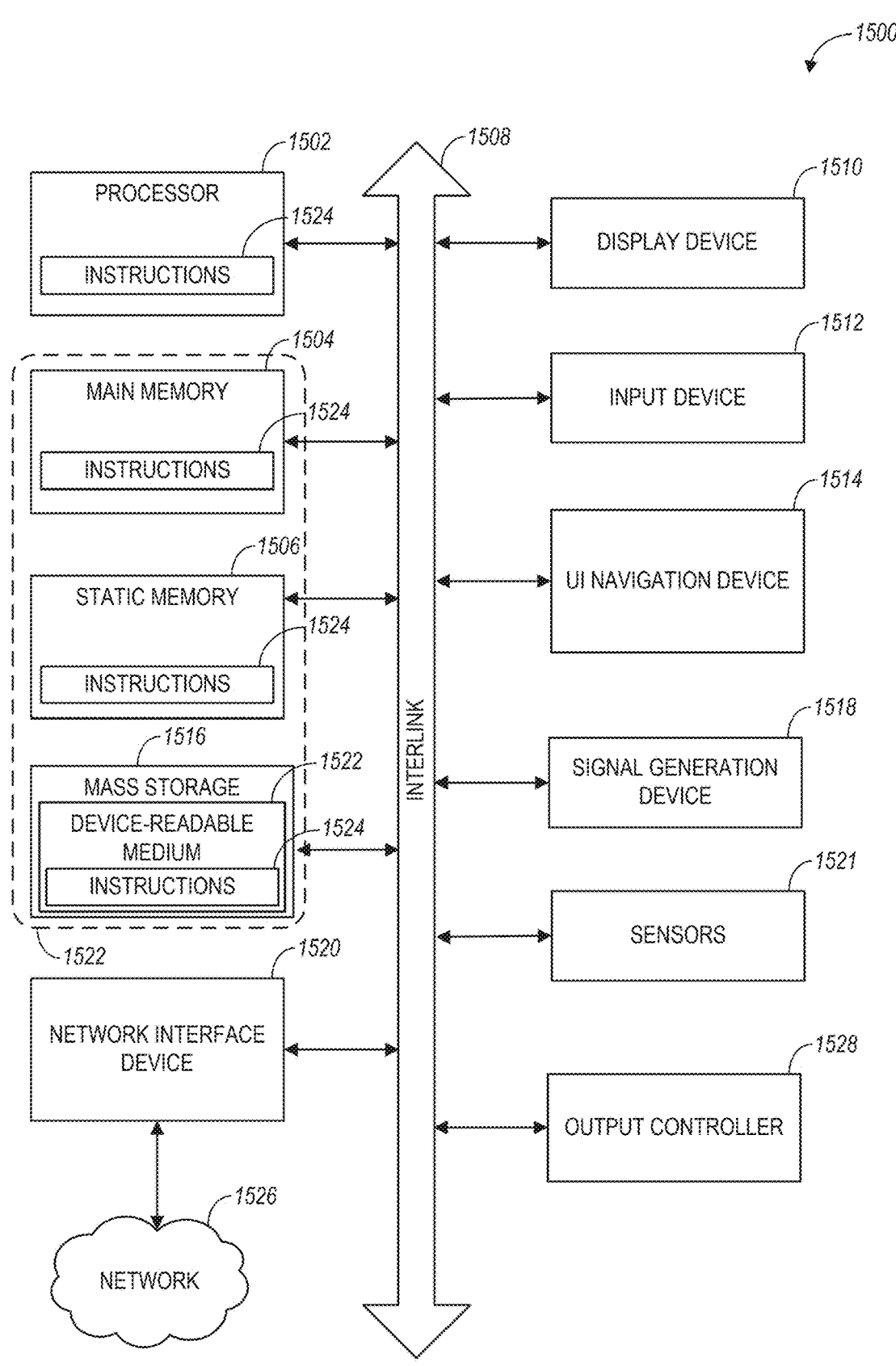
FIG. 15 illustrates a block diagram of a communication device such as an evolved Node-B (eNB), a new generation Node-B (gNB) (or another RAN node), an NCR, an access point (AP), a wireless station (STA), a mobile station (MS), or user equipment (UE), in accordance with some aspects.

FIG. 15 illustrates a block diagram of a communication device such as an evolved Node-B (eNB), a new generation Node-B (gNB) (or another RAN node such as a base station), a network-controlled repeater (NCR), an access point (AP), a wireless station (STA), a mobile station (MS), or user equipment (UE), in accordance with some aspects and to perform one or more of the techniques disclosed herein. In alternative aspects, the communication device 1500 may operate as a standalone device or may be connected (e.g., networked) to other communication devices.

Circuitry (e.g., processing circuitry) is a collection of circuits implemented in tangible entities of the device 1500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in the first circuit of a first circuitry at one point in time and reused by a second circuit in the first circuitry, or by a third circuit in a second circuitry at a different time. Additional examples of these components with respect to the device 1500 follow.

In some aspects, the device 1500 may operate as a standalone device or may be connected (e.g., networked) to other devices. In a networked deployment, the communication device 1500 may operate in the capacity of a server communication device, a client communication device, or both in server-client network environments. In an example, the communication device 1500 may act as a peer communication device in a peer-to-peer (P2P) (or other distributed) network environment. The communication device 1500 may be a UE, eNB, PC, tablet PC, STB, PDA, mobile telephone, smartphone, a web appliance, network router, a switch or bridge, or any communication device capable of executing instructions (sequential or otherwise) that specify actions to be taken by that communication device. Further, while only a single communication device is illustrated, the term "com-munication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or several components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules needs not to be instantiated at any one moment in time. For example, where the modules comprise a general-purpose hardware processor configured using the software, the general-purpose hardware processor may be configured as respective different modules at separate times. The software may accordingly configure a hardware processor, for example, to constitute a particular module at one instance of time and to constitute a different module at a different instance of time.

The communication device (e.g., UE) 1500 may include a hardware processor 1502 (e.g., a central processing unit (CPU), a graphics processing unit (GPU), a hardware processor core, or any combination thereof), a main memory 1504, a static memory 1506, and a storage device 1516 (e.g., hard drive, tape drive, flash storage, or other block or storage devices), some or all of which may communicate with each other via an interlink 1508 (e.g., a bus).

The communication device 1500 may further include a display device 1510, an input device 1512 (e.g., a keyboard), and a user interface (UI) navigation device 1514 (e.g., a mouse). In an example, the display device 1510, input device 1512, and UI navigation device 1514 may be a touchscreen display. The communication device 1500 may additionally include a signal generation device 1518 (e.g., a speaker), a network interface device 1520, and one or more sensors 1521, such as a global positioning system (GPS) sensor, compass, accelerometer, or another sensor. The communication device 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a device-readable medium 1522, on which one or more sets of data structures or instructions 1524 (e.g., software) embodying or utilized by any one or more of the techniques or functions described herein are stored. In some aspects, registers of the hardware processor 1502, the main memory 1504, the static memory 1506, and/or the storage device 1516 may be, or include (completely or at least partially), the device-readable medium 1522, on which is stored the one or more sets of data structures or instructions 1524, embodying or utilized by any one or more of the techniques or functions described herein. In an example, one or any combination of the hardware processor 1502, the main memory 1504, the static memory 1506, or the storage device 1516 may constitute the device-readable medium 1522.

As used herein, the term "device-readable medium" is interchangeable with "computer-readable medium" or "machine-readable medium." While the device-readable medium 1522 is illustrated as a single medium, the term "communication device-readable medium" may include a single medium or multiple media (e.g., a centralized or distributed database, and/or associated caches and servers) configured to store the instructions 1524. The term "communication device-readable medium" is inclusive of the terms "machine-readable medium" or "computer-readable medium", and may include any medium that is capable of storing, encoding, or carrying instructions (e.g., instructions 1524) for execution by the communication device 1500 and that causes the communication device 1500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1524 may further be transmitted or received over a communications network 1526 using a transmission medium via the network interface device 1520 utilizing any one of several transfer protocols. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of the single-input-multiple-output (SIMO), MIMO, or multiple-input-single-output (MISO) techniques. In some examples, the network interface device 1520 may wirelessly communicate using multiple-user MIMO techniques.

The term "transmission medium" shall be taken to include any intangible medium that is capable of storing, encoding, or carrying instructions for execution by the communication device 1500, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for user equipment (UE) configured for operation in a Fifth Generation New Radio (5G NR) network, the apparatus comprising: processing circuitry, wherein to configure the UE for sub-band full duplex (SBFD) operation in the 5G NR network, the processing circuitry is to: decode radio resource control (RRC) signaling received from a base station, the RRC signaling including at least one channel state information reference signal (CSI-RS) resource set with time-frequency resource allocation associated with a CSI-RS transmission; determine a CSI reporting band with a plurality of physical resource blocks (PRBs) based on the RRC signaling, the CSI reporting band including a subset of the plurality of PRBs associated with one or more downlink (DL) subband(s) in symbols or slots identified via higher layer signaling or a combination of higher layer and Layer 1 signaling for SBFD operation; perform channel measurements based on CSI-RSs transmitted during the CSI-RS transmission, the channel measurements associated with the subset of the plurality of PRBs in the CSI reporting band; and encode CSI report based on the channel measurements for transmission to the base station; and a memory coupled to the processing circuitry and configured to store the RRC signaling and the channel measurements.

In Example 2, the subject matter of Example 1 includes, wherein the processing circuitry is to: encode the channel measurements as subband or wideband CSI during CSI reporting, the subband or wideband CSI configured based on measurement resources indicated by the RRC signaling.

In Example 3, the subject matter of Example 2 includes, wherein the processing circuitry is to: decode the RRC signaling to obtain the measurement resources, the measurement resources comprising at least one of a CSI-RS resource, a channel state information interference measurement (CSI-IM) resource, a cross-link interference received signal strength indicator (CLI-RSSI) resource, a cross-link interference reference signal received power (CLI-RSRP) resource, and a sounding reference signal (SRS) resource.

In Example 4, the subject matter of Examples 2-3 includes, wherein the processing circuitry is to: decode the RRC signaling to obtain a list of a number of PRBs and a bit map indicating CSI reporting subbands in the CSI reporting band.

In Example 5, the subject matter of Example 4 includes, wherein each of the number of PRBs in the list is associated with one reporting subband.

In Example 6, the subject matter of Examples 2-5 includes, wherein the processing circuitry is to: determine a CSI subband associated with the CSI reporting using a downlink (DL) bandwidth part (BWP); and calculate the subband CSI based on available UE measurement resources.

In Example 7, the subject matter of Examples 2-6 includes, wherein the processing circuitry is to: determine a CSI subband associated with the CSI reporting using one or more PRBs of the plurality of PRBs within downlink (DL) subbands.

In Example 8, the subject matter of Examples 2-7 includes, wherein the processing circuitry is to: determine a CSI subband associated with the CSI reporting based on a total number of PRBs of the plurality of PRBs within downlink (DL) subbands.

In Example 9, the subject matter of Examples 1-8 includes, wherein the processing circuitry is to: encode the channel measurements as a CSI report configured for SBFD operation.

In Example 10, the subject matter of Examples 1-9 includes, transceiver circuitry coupled to the processing circuitry; and one or more antennas coupled to the transceiver circuitry.

Example 11 is a non-transitory computer-readable storage medium that stores instructions for execution by one or more processors of a base station, the instructions to configure the base station for sub-band full duplex (SBFD) operation in a Fifth Generation New Radio (5G NR) network, and to cause the base station to perform operations comprising: encoding radio resource control (RRC) signaling for transmission to a user equipment (UE), the RRC signaling including at least one channel state information reference signal (CSI-RS) resource set with time-frequency resource allocation associated with a CSI-RS transmission; encoding the RRC signaling to further include, a CSI reporting band with a plurality of physical resource blocks (PRBs), the CSI reporting band including a subset of the plurality of PRBs associated with one or more DL subband(s) in symbols or slots identified via higher layer signaling or a combination of higher layer and Layer 1 signaling for sub-band full duplex (SBFD) operation; performing the SBFD operation based on encoding one or more of downlink (DL) data or CSI-RS for a downlink transmission to the UE, the downlink transmission being performed simultaneously with reception of uplink (UL) data or UL reference signals from one or more uplink transmission(s) by one or more second UE(s); and decoding CSI report based on channel measurements received from the UE, the channel measurements based on CSI-RSs transmitted during the CSI-RS transmission, the channel measurements associated with the subset of the plurality of PRBs in the CSI reporting band.

In Example 12, the subject matter of Example 11 includes, the operations further comprising: decoding the channel measurements received in a CSI report configured for SBFD operation.

Example 13 is a non-transitory computer-readable storage medium that stores instructions for execution by one or more processors of a user equipment (UE), the instructions to configure the UE for sub-band full duplex (SBFD) operation in a Fifth Generation New Radio (5G NR) network, and to cause the UE to perform operations comprising: decoding radio resource control (RRC) signaling received from a base station, the RRC signaling including at least one channel state information reference signal (CSI-RS) resource set with time-frequency resource allocation associated with a CSI-RS transmission; determine a CSI reporting band with a plurality of physical resource blocks (PRBs) based on the RRC signaling, the CSI reporting band including a subset of the plurality of PRBs associated with one or more DL subband(s) in symbols or slots identified via higher layer signaling or a combination of higher layer and Layer 1 signaling for sub-band full duplex (SBFD) operation; performing channel measurements based on CSI-RSs transmitted during the CSI-RS transmission, the channel measurements associated with the subset of the plurality of PRBs in the CSI reporting band; encoding CSI report based on the channel measurements for transmission to the base station.

In Example 14, the subject matter of Example 13 includes, the operations further comprising: encoding the channel measurements as subband CSI during CSI reporting, the subband CSI configured based on measurement resources indicated by the RRC signaling.

In Example 15, the subject matter of Example 14 includes, the operations further comprising: decoding the RRC signaling to obtain the measurement resources, the measurement resources comprising at least one of a CSI-RS resource, a channel state information interference measurement (CSI-IM) resource, a cross-link interference received signal strength indicator (CLI-RSSI) resource, a cross-link interference reference signal received power (CLI-RSRP) resource, and a sounding reference signal (SRS) resource.

In Example 16, the subject matter of Examples 14-15 includes, the operations further comprising: decoding the RRC signaling to obtain a list of a number of PRBs and a bit map indicating CSI reporting subbands in the CSI reporting band.

In Example 17, the subject matter of Example 16 includes, wherein each of the number of PRBs in the list is associated with one reporting subband.

In Example 18, the subject matter of Examples 14-17 includes, the operations further comprising: determining a CSI subband associated with the CSI reporting using a downlink (DL) bandwidth part (BWP); and calculating the subband CSI based on available UE measurement resources.

In Example 19, the subject matter of Examples 14-18 includes, the operations further comprising: determining a CSI subband associated with the CSI reporting using one or more PRBs of the plurality of PRBs within downlink (DL) subbands.

In Example 20, the subject matter of Examples 14-19 includes, the operations further comprising: determining a CSI subband associated with the CSI reporting based on a total number of PRBs of the plurality of PRBs within downlink (DL) subbands.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described concerning specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a New Radio (NR) network, the apparatus comprising:

processing circuitry, wherein to configure the UE for sub-band non-overlapping full duplex (SBFD) operation in the NR network, the processing circuitry is to:
   decode radio resource control (RRC) signaling from a base station, the RRC signaling to configure a channel state information reference signal (CSI-RS) resource set, the CSI-RS resource set comprising at least a first set of CSI-RS resource occasions configured within SBFD symbols and at least a second set of CSI-RS resource occasions overlapping with non-SBFD symbols;

detect the CSI-RS resource set includes an indicator indicating the CSI-RS resource set is configured for the SBFD operation;

select based on the indicator, a CSI-RS resource occasion from the first set of CSI-RS resource occasions configured within the SBFD symbols; and encode a CSI report for transmission to the base station using the selected CSI-RS resource occasion; and memory coupled to the processing circuitry and configured to store the RRC signaling.

2. The apparatus of claim 1, wherein the processing circuitry is to:

determine the first set of CSI-RS resource occasions configured within SBFD symbols as valid resource occasions, and the second set of CSI-RS resource occasions overlapping with non-SBFD symbols as invalid resource occasions; and select another CSI-RS resource occasion for a subsequent CSI report from the valid resource occasions.

3. The apparatus of claim 1, wherein the processing circuitry is to:

decode second RRC signaling from the base station, the second RRC signaling to configure a second CSI-RS resource set, the second CSI-RS resource set comprising at least a third set of CSI-RS resource occasions configured within the SBFD symbols and at least a fourth set of CSI-RS resource occasions overlapping with the non-SBFD symbols; and detect the second CSI-RS resource set includes a second indicator indicating the second CSI-RS resource set is configured for non-SBFD operation.

4. The apparatus of claim 3, wherein the processing circuitry is to:

select based on the second indicator, a second CSI-RS resource occasion from the fourth set of CSI-RS resource occasions overlapping with the non-SBFD symbols; and encode a second CSI report for transmission to the base station using the selected second CSI-RS resource occasion.

5. The apparatus of claim 1, wherein the processing circuitry is to:

perform based on the indicator, cross-link interference (CLI) reporting using the CSI-RS resource occasion from the first set of CSI-RS resource occasions configured within the SBFD symbols, when the UE is configured with the SBFD symbols.

6. The apparatus of claim 1, further comprising:

transceiver circuitry coupled to the processing circuitry; and one or more antennas coupled to the transceiver circuitry.

7. A non-transitory computer-readable storage medium that stores instructions for execution by one or more processors of a user equipment (UE), the instructions to configure the UE for sub-band non-overlapping full duplex (SBFD) operation in a New Radio (NR) network, and to cause the UE to perform operations comprising:

decoding radio resource control (RRC) signaling from a base station, the RRC signaling to configure a channel state information reference signal (CSI-RS) resource set, the CSI-RS resource set comprising at least a first set of CSI-RS resource occasions configured within SBFD symbols and at least a second set of CSI-RS resource occasions overlapping with non-SBFD symbols;

detecting the CSI-RS resource set includes an indicator indicating the CSI-RS resource set is configured for the SBFD operation;

selecting based on the indicator, a CSI-RS resource occasion from the first set of CSI-RS resource occasions configured within the SBFD symbols; and encoding a CSI report for transmission to the base station using the selected CSI-RS resource occasion.

8. The non-transitory computer-readable storage medium of claim 7, the operations comprising:

determining the first set of CSI-RS resource occasions configured within SBFD symbols as valid resource occasions, and the second set of CSI-RS resource occasions overlapping with non-SBFD symbols as invalid resource occasions; and selecting another CSI-RS resource occasion for a subsequent CSI report from the valid resource occasions.

9. The non-transitory computer-readable storage medium of claim 7, the operations comprising:

decoding second RRC signaling from the base station, the second RRC signaling to configure a second CSI-RS resource set, the second CSI-RS resource set comprising at least a third set of CSI-RS resource occasions configured within the SBFD symbols and at least a fourth set of CSI-RS resource occasions overlapping with the non-SBFD symbols; and detecting the second CSI-RS resource set includes a second indicator indicating the second CSI-RS resource set is configured for non-SBFD operation.

10. The non-transitory computer-readable storage medium of claim 9, the operations comprising:

selecting based on the second indicator, a second CSI-RS resource occasion from the fourth set of CSI-RS resource occasions overlapping with the non-SBFD symbols; and encoding a second CSI report for transmission to the base station using the selected second CSI-RS resource occasion.

11. The non-transitory computer-readable storage medium of claim 7, the operations comprising:

performing based on the indicator, cross-link interference (CLI) reporting using the CSI-RS resource occasion from the first set of CSI-RS resource occasions configured within the SBFD symbols, when the UE is configured with the SBFD symbols.

12. A user equipment (UE) configured for operation in a New Radio (NR) network, the UE comprising:

a front-end circuitry coupled to one or more antennas; and processing circuitry coupled to the front-end circuitry, wherein to configure the UE for sub-band non-overlapping full duplex (SBFD) operation in the NR network, the processing circuitry is to:

decode radio resource control (RRC) signaling from a base station, the RRC signaling to configure a channel state information reference signal (CSI-RS) resource set, the CSI-RS resource set comprising at least a first set of CSI-RS resource occasions configured within SBFD symbols and at least a second set of CSI-RS resource occasions overlapping with non-SBFD symbols;

detect the CSI-RS resource set includes an indicator indicating the CSI-RS resource set is configured for the SBFD operation;

select based on the indicator, a CSI-RS resource occasion from the first set of CSI-RS resource occasions configured within the SBFD symbols; and encode a CSI report for transmission to the base station using the selected CSI-RS resource occasion.

13. The UE of claim 12, wherein the processing circuitry is to:

determine the first set of CSI-RS resource occasions configured within SBFD symbols as valid resource occasions, and the second set of CSI-RS resource occasions overlapping with non-SBFD symbols as invalid resource occasions; and select another CSI-RS resource occasion for a subsequent CSI report from the valid resource occasions.

14. The UE of claim 12, wherein the processing circuitry is to:

decode second RRC signaling from the base station, the second RRC signaling to configure a second CSI-RS resource set, the second CSI-RS resource set comprising at least a third set of CSI-RS resource occasions configured within the SBFD symbols and at least a fourth set of CSI-RS resource occasions overlapping with the non-SBFD symbols; and detect the second CSI-RS resource set includes a second indicator indicating the second CSI-RS resource set is configured for non-SBFD operation.

15. The UE of claim 14, wherein the processing circuitry is to:

select based on the second indicator, a second CSI-RS resource occasion from the fourth set of CSI-RS resource occasions overlapping with the non-SBFD symbols; and encode a second CSI report for transmission to the base station using the selected second CSI-RS resource occasion.

16. The UE of claim 12, wherein the processing circuitry is to:

perform based on the indicator, cross-link interference (CLI) reporting using the CSI-RS resource occasion from the first set of CSI-RS resource occasions configured within the SBFD symbols, when the UE is configured with the SBFD symbols.

* * * * *